July 8, 1947. L. E. DE NEERGAARD 2,423,440
AUTOMATIC CONTROL OF MACHINE TOOLS AND FABRICATING DEVICES
Filed Oct. 6, 1942 8 Sheets-Sheet 1
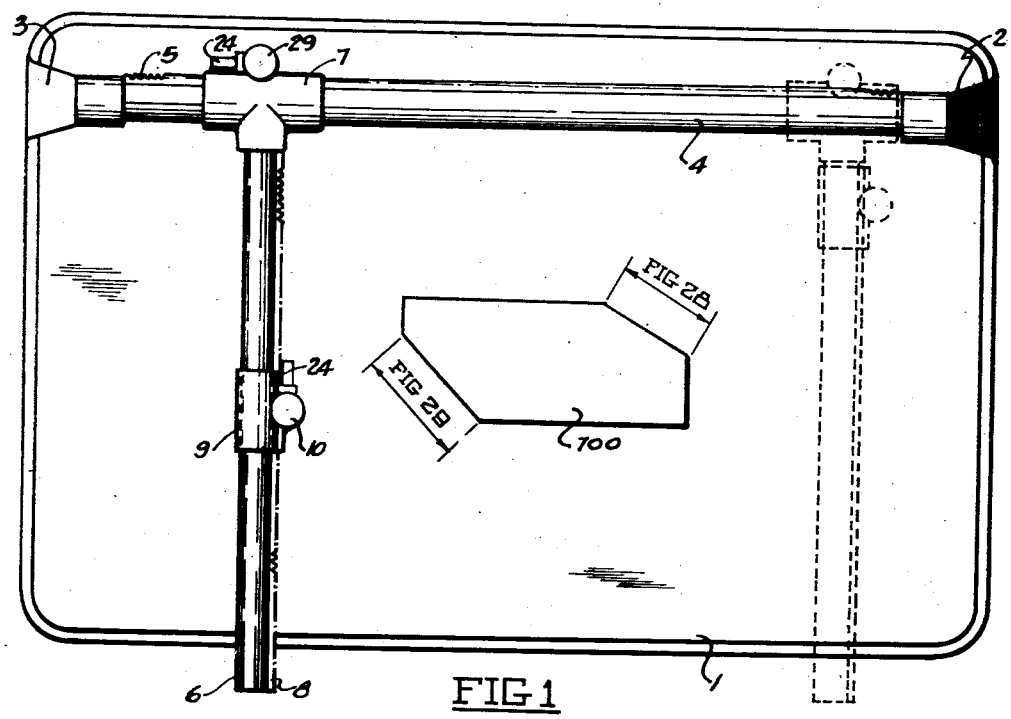
FIG 1
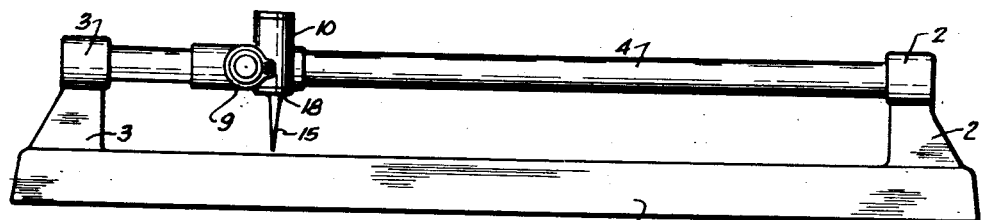
FIG 2
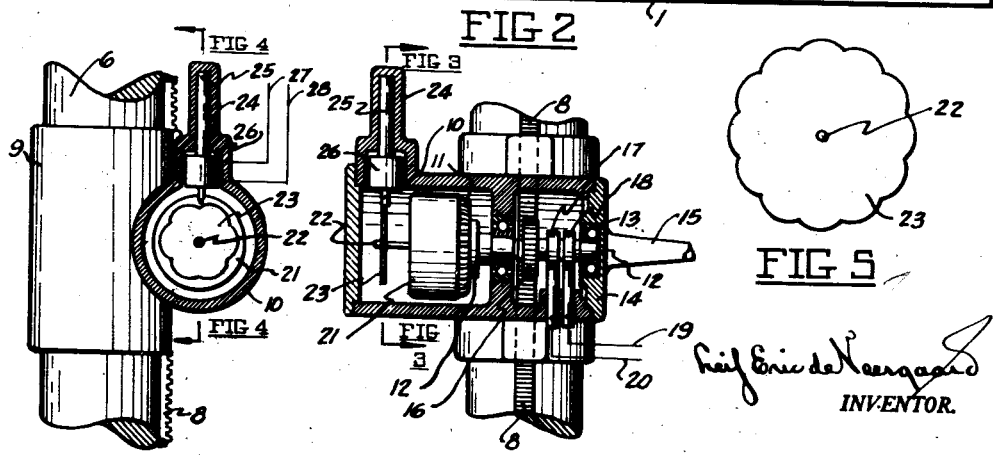
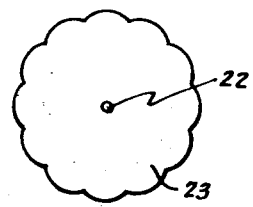
FIG 3  FIG 4  FIG 5

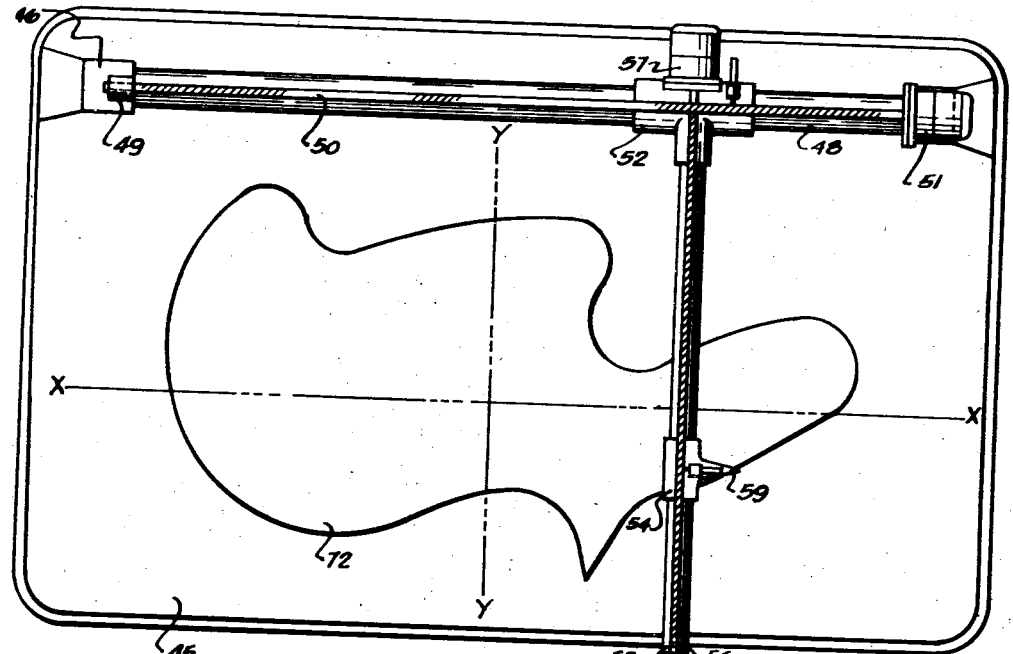
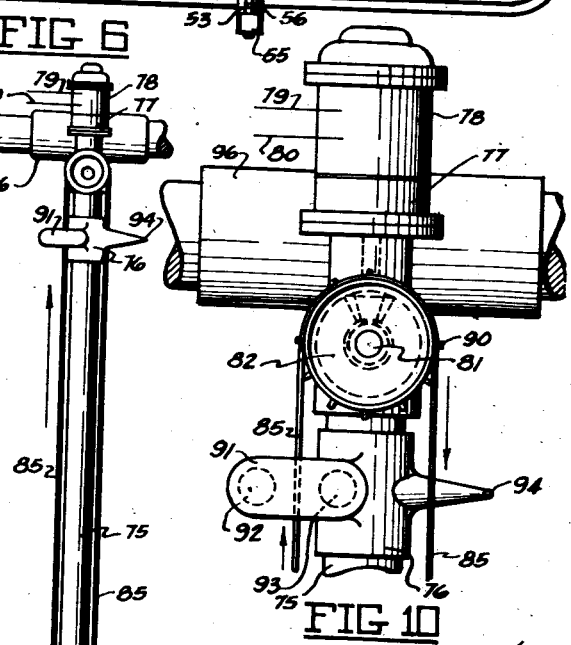
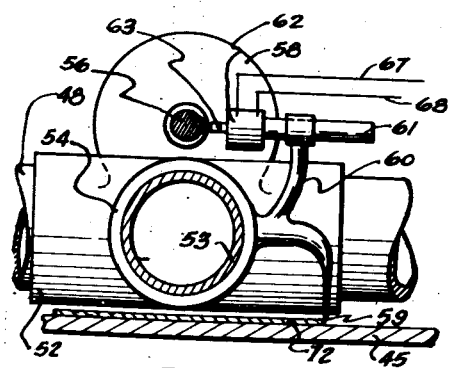
FIG 7
FIG 8
FIG 9
FIG 10
Carl Eric de Neergaard
INVENTOR.

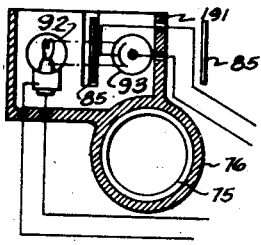
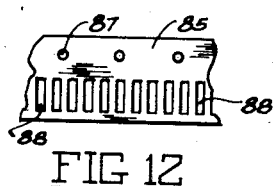
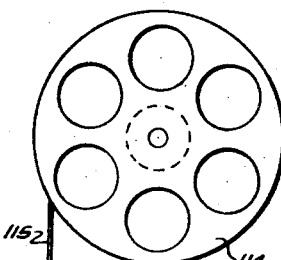
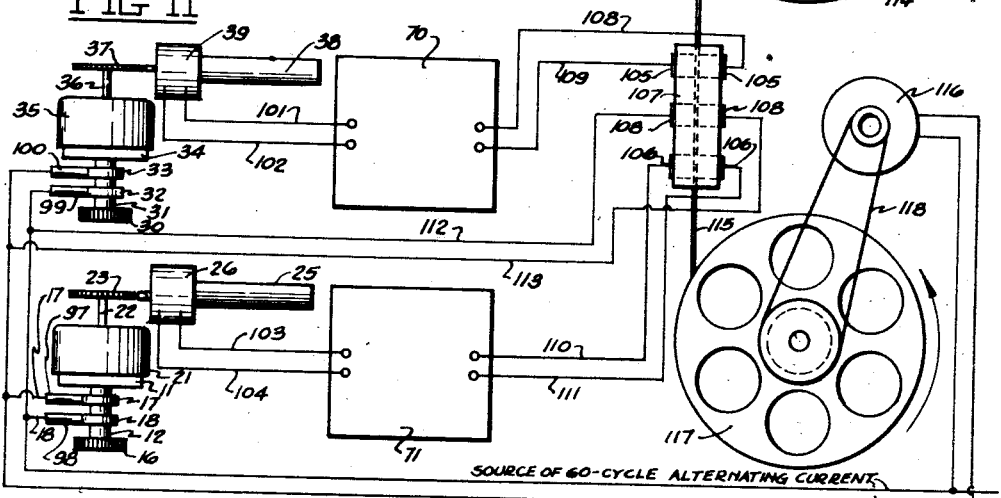
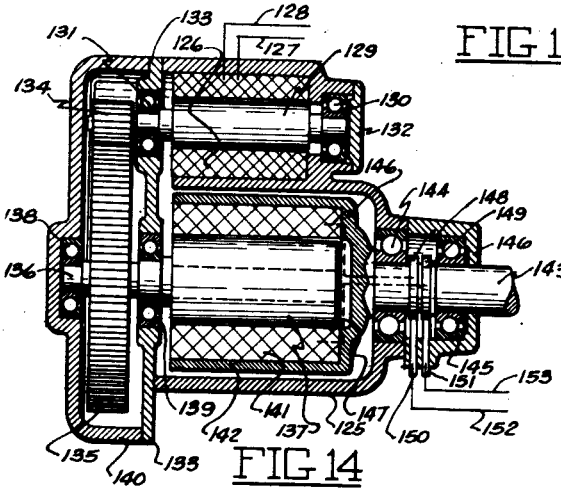
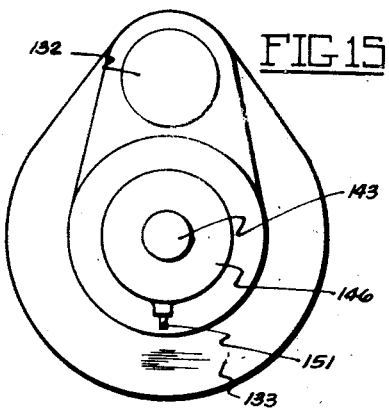

July 8, 1947. L. E. DE NEERGAARD 2,423,440
AUTOMATIC CONTROL OF MACHINE TOOLS AND FABRICATING DEVICES
Filed Oct. 6, 1942 8 Sheets-Sheet 4

Leif Eric de Neergaard
INVENTOR.

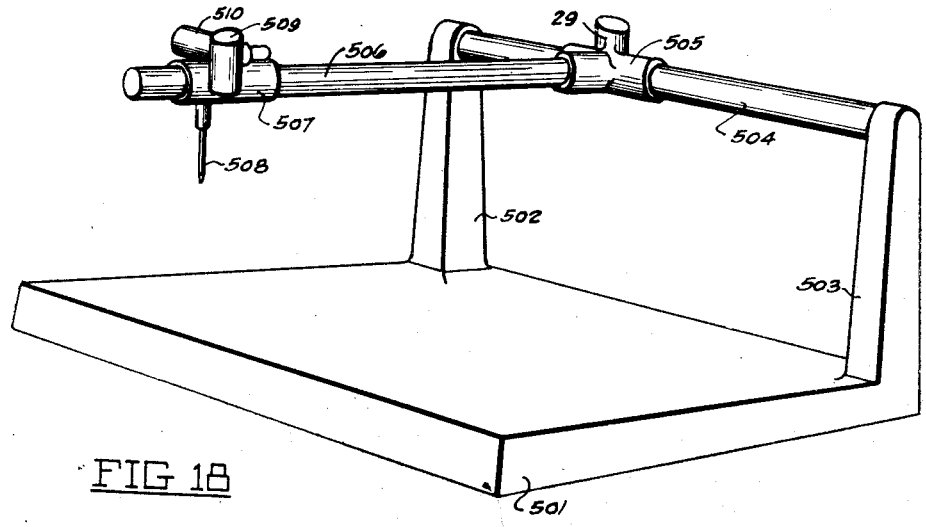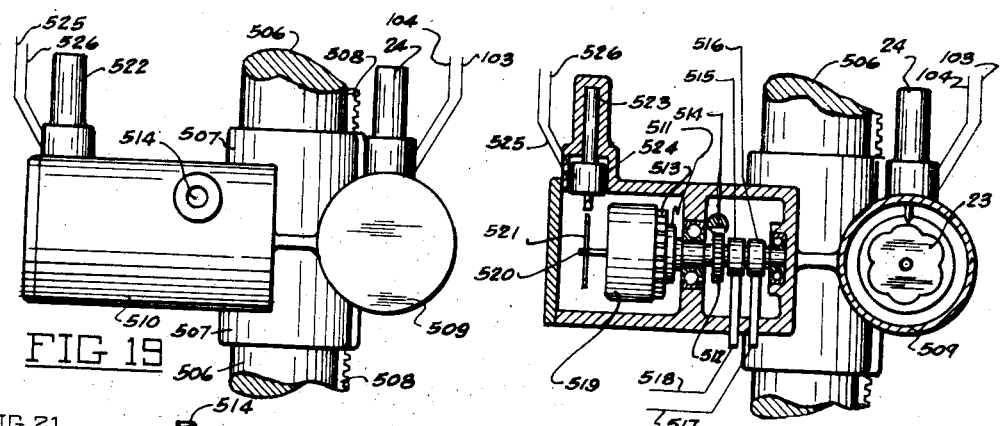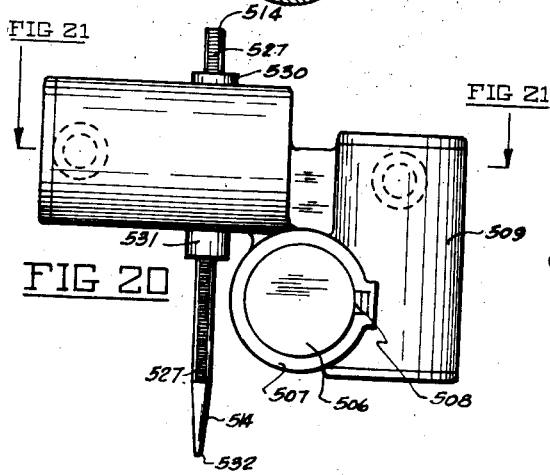

July 8, 1947.    L. E. DE NEERGAARD    2,423,440
AUTOMATIC CONTROL OF MACHINE TOOLS AND FABRICATING DEVICES
Filed Oct. 6, 1942    8 Sheets-Sheet 7

Leif Eric de Neergaard
INVENTOR.

July 8, 1947.                L. E. DE NEERGAARD                2,423,440
           AUTOMATIC CONTROL OF MACHINE TOOLS AND FABRICATING DEVICES
                    Filed Oct. 6, 1942           8 Sheets-Sheet 8

*Leif Eric de Neergaard*
INVENTOR.

Patented July 8, 1947

2,423,440

UNITED STATES PATENT OFFICE 2,423,440

AUTOMATIC CONTROL OF MACHINE TOOLS AND FABRICATING DEVICES

Leif Eric de Neergaard, New York, N. Y., assignor, by mesne assignments, to Actrol Incorporated, a corporation of Delaware Application October 6, 1942, Serial No. 460,955

6 Claims. (Cl. 178—19)

This invention pertains to electrical controls and more specifically to the automatic control of the magnitude and direction of rotation of lead-screws, controlling the displacement of tables, platens, carriages and like members of machine tools in one or more planes.

An object of this invention is the provision of methods and means by whose use the outline of two-dimensional figures or the surfaces of three dimensional solids can be converted or translated into so-called "frequency-patterns" or records which can be used thousands or hundreds of thousands of times to control the completely automatic work-cycles of a lead-screw-controlled machine-tool a like number of times.

A further highly valuable result obtained by the use of my invention is the furnishing of methods and means by whose use a completely automatic machine-tool control, capable of controlling multi-feeds of work-to-tool or tool-to-work members through thousands or tens of thousands of complete work-cycles, can be produced, which has no operating error in the control system per se whatsoever.

Another distinctly valuable result, obtained by the use of the invention, is to provide a completely new system for the fully automatic control of the repetitive work-cycles of machine-tools, which is capable of so closely controlling the machining, grinding or other operations of a tool, that the dimensional limitations of the parts, being machined, can be readily and continuously held to within such close limits as plus or minus .0001" under certain controlled conditions.

Yet another object of the invention is to supply methods and apparatus to fully control the automatic, repetitive operation of various machine-tools by a very simple, inexpensive record which can be substituted in a few seconds by another record which will cause the controlled machine-tool to repeatedly pass through a new work-cycle completely different to the movements of the work-to-tool or tool-to-work movements controlled by the first control-record.

Another valuable object, secured by the use of my invention is the provision of methods and means by whose use, relative displacement, between a machine-tool's material-removing edge or edges and the work being machined, is made in a continuous step-less manner, regardless of variations in the direction of the displacements from instant to instant and regardless of whether the displacements are in one or more planes.

A further desired object, obtained by the use of the invention, is the furnishing of methods and means for continuously generating and recording an alternating-current of a base or fixed frequency simultaneous to the generation and recording of longitudinal control and lateral control alternating-current frequencies.

Another object of the invention is the provision of methods and means whereby a frequency-differential is added to a base-frequency alternating-current when a stylus, follower or finger is displaced in one direction and a similar frequency-differential is subtracted from the base-frequency alternating-current upon similar displacement of the finger, follower or stylus in the opposite direction.

Another object of the invention is to supply methods and means whereby an alternating-current is caused to vary above or below a base-frequency in exact proportion to the magnitude of the displacement of a finger, follower or stylus.

Still another valuable result subserved by the use of this invention is the provision of methods and means for reproducing or recreating the recorded frequencies of longitudinal and lateral-control alternating-currents along with a base-frequency, separately amplifying these frequencies and controlling the simultaneous longitudinal and lateral displacements of platens, carriages, work tables or other work-to-tool or tool-to-work members of machine-tools, in direct response to the differential between the longitudinal control frequency and the recreated base frequency and the differential between the lateral control frequency and the reproduced base-frequency.

A further result obtained by the use of the invention is the provision of methods and means, whereby a control-record, upon which a base-frequency, a longitudinal and a lateral control frequency have been impressed, can be "played back" at a different linear rate than when it was recorded. This feature, as will be later brought out, is of a very great importance.

Other highly important and valuable results obtained by the use of this invention will become manifest after study of the specifications and drawings in which:

Figure 1 illustrates in plan view one species of translator by whose use the configurations of plane figures are converted into two variable frequency-currents.

Figure 2 illustrates in front elevation the translator illustrated by Figure 1.

Figure 3 depicts one species of frequency-generator used in conjuction with the translator illustrated by Figure 1.

Figure 4 is a cross section taken through Figure 3 and shows the same frequency-generator illustrated in the prior figure, but in elevation.

Figure 5 is an illustration, in plan, of a tone-wheel used in the frequency-generator illustrated by Figures 3 and 4.

Figure 6 illustrates in plan a second translator which uses a second type of frequency-generator.

Figure 7 illustrates in plan and in more detail, certain details of the frequency-generator used in the translator illustrated by Figure 6.

Figure 8 is a cross section taken in a vertical plane through one element of the translator illustrated by Figure 6 and illustrates certain details of the frequency-generator used.

Figure 9 illustrates a third species of frequency-generator which may be used by a translator.

Figure 10 illustrates, in plan, the details of the frequency-generator illustrated by Figure 9.

Figure 11 is a vertical cross-section taken through a slideable member illustrated by Figure 10 and shows some of the frequency-generating elements in detail.

Figure 12 illustrates a light-flux interrupter used in conjunction with the apparatus illustrated by Figures 3, 10 and 11.

Figure 13 is a schematic layout of the dual frequency-generating means, used by the translator illustrated by Figures 1, 2, 3, 4 and 5, along with a preferred species of frequency-recording means.

Figure 14 is a cross-section, taken in a vertical plane, through a preferred form of electrical-differential or power-unit whose motivation controls the linear movement of machine-tool work-tables, platens, carriages and the like.

Figure 15 is an external end-elevation of the power-unit illustrated in section by Figure 14.

Figure 18 is a perspective view of a translator capable of converting the boundary surface of a solid into a three-dimensional frequency-pattern.

Figure 19 is a detailed view of a cross-head used in conjunction with the translator illustrated by Figure 18.

Figure 20 is an elevation of the cross-head illustrated in plan by Figure 19.

Figure 21 is a cross-section taken through the cross-head illustrated by Figures 19 and 20.

Figures 16, 17:
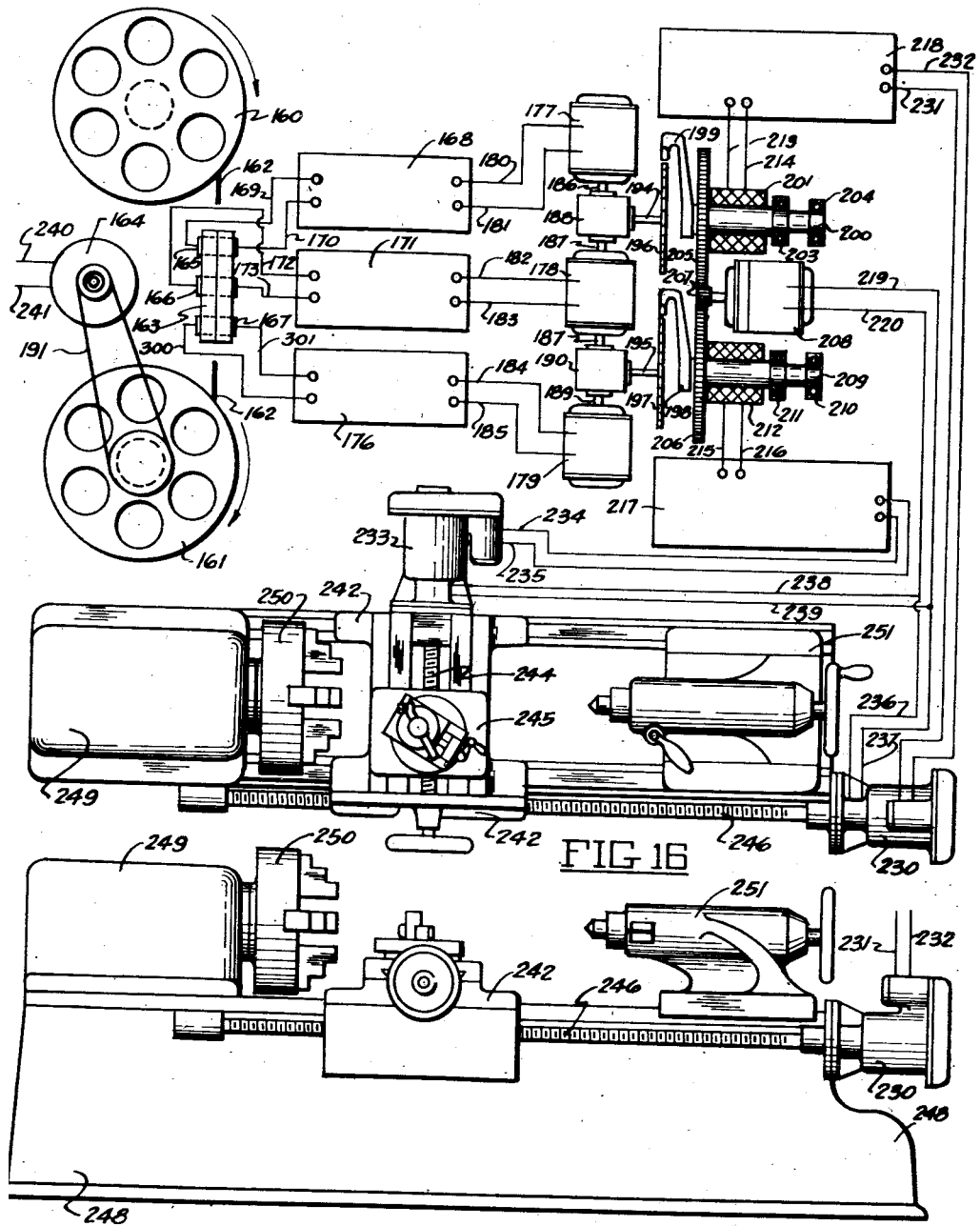
Figure 16 is a schematic illustration of a record "play-back" device of preferred form, a species of frequency-regeneration, and a lathe with the essential amplifiers, motors and circuits necessary for the lathe's automatic control also shown in a more or less schematic manner.
Figure 17 is a front elevation of the lathe illustrated by Figure 16.

Figure 1, as stated, illustrates a translator in plan-view. The translator consists of the base 1 with integral brackets 2 and 3, upwardly extending from the top surface of the base 1. The top surface of the base is machined and ground to a plane-surface upon which the template form or outline, which is to be analyzed, is laid and secured.

A tubular support 4, extends between, and is rigidly supported by the two brackets 2 and 3, in such a manner that the axis of the support 4, is in exact parallelism with the flat, machined top surface of the base 1. A gear-rack, 5, extends the full length of, and is integral to the support 4.

A boom 6 whose axis is at all times exactly 90 degrees to the axis of the tubular support 4, extends over the top surface of the base 1. This boom is integrally fastened to a slide-head, 7, which is slideably supported by the tubular support 4. Preferably, the weight of the boom and the slide-head, 7, is low, and the sliding-friction between the slide-head and the tubular support, 4, is reduced to a minimum, so that the boom, 6, can be moved along the length of the support, 4, with practically no effort.

A second gear-rack, 8, identical in pitch to gear-rack, 5, extends along the length of the boom, 6, from the slide-head, 7, to the end of the boom. This rack, 8, is integral to the boom which, it will be understood, extends over the base, 1, so that the axis of the boom is parallel at all times to the upper, plane-surface of the base 1.

A cross-head, 9, consisting of a tubular-sleeve and a frequency-generator housing 10, made of brass or a similar non-magnetic material is slideably supported by the tubular-boom 6. The tubular-sleeve of the cross-head, 9, has a key-way extending throughout its length which key-way registers with the gear-rack, 8, which, as stated, is fastened integrally to the boom 6. This design prevents rotation of the cross-head 9, about the tubular-boom.

As stated, the frequency-generator housing 10, is integral to the cross-head 9. Figure 4 is a cross-section taken through the axis of the housing 10. By study of Figures 3 and 4 it will be seen that the axis of this housing is at 90 degrees to the axis of the boom-borne, sleeve section of the cross-head 9. Referring to Figure 4, it will be seen that a stator, 11, of a small synchronous motor is integrally fastened to the upper end of a pinion-shaft 12, which is rotatably supported by two ball-bearings. The upper ball-bearing's outer-race is supported by the housing, 10, while the lower ball-bearing, 13, is carried by the bottom end-plate, 14, which is rigidly fastened to the housing 10.

A stylus or pointer 15, dependent from and integral to the end-plate 14, is suspended over the base 1. The stylus 15, terminates in a sharp, hardened point which clears the horizontal, plane-surface of the base 1, by a few thousandths of an inch. Figure 2 illustrates this condition.

The pinion shaft 12, which is made of Bakelite, "Lucite" or a similar non-conducting material, integrally mounts a pinion 16, whose peripherally disposed teeth are in constant engagement with the teeth of the gear-rack 8. Two slip-rings 17 and 18 made of bronze or like conducting material, are concentrically fitted on the pinion shaft 12. It will be seen that by sliding the cross head 9 along the boom 6, the stator 11 will be rotated by the pinion 16.

Two electrical conductors (not shown) extend from the two slip-rings, to which they are separately electrically bonded, through a concentrically bored section of the pinion shaft to the windings of the synchronous motor stator 11. Alternating-current from an outside source is led to the two slip-rings 17 and 18, by two conductors 19 and 20, through two carbon brushes which are lightly pressed by means of springs (not shown) against the flat, peripheral faces of the slip-rings.

The rotor 21, of the synchronous motor terminates in a shaft or staff, 22, upon whose upper-end a tone-wheel, 23, is pressed. This tone-wheel is made of soft iron and is some six to ten hundredths of an inch in thickness. Figure 5 illustrates a tone-wheel in detail which has twelve lobes or high-points. As may be seen from this figure, twelve lobes of folded sine-wave form are cut at equal spaces about the periphery of the tone-wheel. In practice it will be found that a tone-wheel whose diameter is half the diameter of the wheel illustrated by Figure 5 will work satisfactorily.

An extension 24, integral to the housing 10, serves as an enclosure and rigid support for a pick-up magnet 25, which is made of "Alnico," cobalt steel, or any other material having a very high magnetic-retentivity used in superior-quality, permanent magnets. The pick-up magnet is approximately two to three inches in length, while its diameter may be in the neighborhood of .25" to .30".

One end of the pick-up magnet 25, is reduced in diameter and ground to a wedge-end, the included angle between the two flats of the wedge being preferably sixty degrees or less.

A coil 26, consisting of thousands of turns of very fine wire is pressed over the small diameter end of the pick-up magnet so that it is immediately adjacent to, but back of the wedge-end of the magnet. The two end-leads of the pick-up coil 26, are brought out of the frequency-generator housing and are electrically connected to the two insulated conductors 27 and 28.

The slide-head 7, which is similar to the cross-head 9, and is made of a non-magnetic material such as brass or aluminum, also has a frequency-generator housing 29, integral to its sleeve-like section. Figure 1 clearly illustrates the position of the housing 29, whose axis is 90 degrees to the axis of the tubular-support 4.

A frequency-generator similar in all respects to the one described with reference to the cross-head 9 is mounted within the slide-head 7. This frequency-generator consists of a pinion 30, which is mounted on a pinion-shaft 31; two slip-rings 32 and 33; a synchronous motor stator 34 mounted on shaft 31; a rotor 35; a rotor-shaft 36; a tone-wheel 37, integral to the rotor-shaft 36; a pick-up, permanent magnet 38, and an induction or pick-up coil 39. The pinion 30 is identical to the pinion 16 and it engages the gear-rack 5 so that the stator 34 will be rotated when the slide-head 7 is moved along the support 4. The rate of rotation of the stator 34 will be the same as the rate of rotation of the stator 11 when the slide-head and cross-head 9 are moved along their respective supports at the same rate.

The two frequency-generators, separately carried by the slide-head 7, and the cross-head 9, are illustrated at the left of Figure 13, which also illustrates that the two frequency-generator, drive-motors are both supplied by 60 cycle, single-phase, alternating-current from a commercial source of current-supply, common to both motors. This current, as has already been brought out is supplied to the stators, 11 and 34, of the two motors through their separate carbon brushes and slip-rings.

The two small synchronous motors, as stated, are identical. The motors illustrated are of the reluctance type, are self-starting and rotate in one direction only. The stators have twelve poles. Therefore, the rotors 21 and 35 have a synchronous speed of 600 R. P. M. or 10 R. P. S., since the stators are both energized with 60 cycle alternating-current at all times.

As stated, the tone-wheel 23, is rigidly fastened to the rotor 22, while the tone-wheel 37, is similarly mounted on the rotor-shaft 36. Therefore, it will be seen that both of these tone-wheels are rotated at a constant angular velocity of 10 R. P. S. in relation to the stators 11 and 34.

As will be readily understood by those skilled in the art, when the tone-wheels are rotated, a feeble alternating current will be generated in the coils 26 and 39 due to the pulsating electromagnetic field set up in the permanent-magnets by the continuously increasing and decreasing air-gaps between the irregular peripheries of the tone-wheels and the magnets. For purposes of illustration, it will be assumed that the two tone-wheels 23 and 37, Figure 13, used in the translator, illustrated by Figures 1 and 2, have six high-points or lobes.

Thus, when the stators 11 and 34 are stationary, and the rotors rotating at 10 R. P. S., the tone-wheels will rotate at 10 R. P. S. and cause alternating currents to be generated in the coils 26 and 39 having frequencies of 60 cycles/sec., or identical to that of the current supplied to the stators by the commercial source of supply. This frequency will hereinafter be referred to as the base-frequency.

It is to be understood that if the speeds of the synchronous motors were different, for example, 5 R. P. S., then tone-wheels having 12 lobes would be used, as illustrated in Fig. 5, to cause a 60 cycle frequency current to be produced by the frequency generators. The base-frequencies generated in coils 26 and 39 should, in any event, be the same as the frequency of the current supplied to the synchronous motors.

The frequencies of the currents generated by the frequency generators will be changed by movement of the heads 7 and 9 along their respective supports, and the magnitude of the frequency-differential will be in accordance with the rate of movement. For example, when beam 6 is moved from right to left, as viewed in Fig. 1, the stator 34 will be rotated clockwise by the pinion 30. Since the rotation of the rotor 35 relative to the stator 34 is always 10 R. P. S., or constant and is clockwise, the R. P. S. of the rotor will be increased by an amount equal to the R. P. S. of the stator. This causes an increase in the frequency of the current generated in the coil 39 over the base-frequency, which increase is proportional to the rate of movement of the beam 6 along the support 4. This increase in frequency over the base-frequency is herein referred to as a positive frequency-differential. Conversely, when the beam 6 is moved in the opposite direction, the stator is rotated counter-clockwise, causing a reduction in the speed of rotation of the rotor by an amount equal to the R. P. S. of the stator. This causes the frequency of the current generated in the coil 39 to be reduced below the base-frequency according to the rate of the beam along the support 4. This reduced frequency is referred to hereinafter as the negative differential-frequency.

It is obvious that the frequency generated in the coil 26 will vary in the same manner when the cross-head 9 is moved toward or away from the support 4 on the beam 6. In the present embodiment of the invention, when the cross-head 9 is moved toward the support 4, a negative frequency-differential will be produced in the coil 26, the magnitude of which differential is proportional to the rate of movement, and movement of the head 9 away from the support 4 will cause a positive frequency-differential to be produced, the magnitude of which differential is proportional to the rate of movement.

From what has been described, it will be seen that as long as the stylus 15, which is integral with the cross-head 9, is stationary, the frequency generated by the two frequency generators and the frequency supplied to the generators will be the same, and that movement of the stylus parallel with the support 4 will result in a change in frequency generated by one frequency generator relative to the frequency of the current supplied to that generator. Also, movement of the stylus parallel to the beam 6 will result in a change in the frequency generated by the frequency generator carried in the cross-head 9 relative to the frequency of the current supplied to the latter frequency generator. Movement of the stylus parallel to the support 4 is sometimes hereinafter referred to as movement along the X—X axis and movement of the stylus parallel to the beam 6 is referred to as movement along the Y—Y axis. Also, the frequency generator in the slide-head 7 may be referred to as the longitudinal-control and the frequency generator in head 9 may be referred to as the lateral-control.

By simultaneously recording the frequencies generated by the two frequency generators and the frequency of the current supplied to the generators, which is the base-frequency and is uneffected by movement of the cross-head 9, it is possible to reproduce the movements of the cross-head, or stylus, from such record. The method and mechanism for carrying this out will be described hereinafter.

Figure 6 is a view, taken in plan, of a translator which uses a different method of simultaneously varying the frequencies of a longitudinal-control frequency-generator and a lateral-control frequency-generator, in response to the varying displacements of a stylus moved in a single plane.

A base 45, substantially identical to the base 1, Figure 1, already described, has two upwardly extending and integral brackets 46 and 47. Both brackets serve as mountings for a tubular-support 48. The bracket 46, further serves as a support for a bearing 49, which rotatably supports one end of a flux-interrupter shaft 50. The other end of the shaft 50, whose axis is parallel to the plane-surface of the base 45 and to the axis of the tubular-support 48, is integral to and is rotatably supported by the low-speed shaft (not shown) of a speed-reducer 51, whose housing is rigidly supported by the bracket 47.

A boom-slide 52, is slidably supported by the tubular-support 48, so that the boom 53, which is integral to the boom-slide, can be substantially frictionlessly displaced in a longitudinal direction over the length of the translator base 45, or from left to right or vice versa as viewed in Figure 6.

A cross-head 54, made of bronze or a similar non-ferrous material, is slidably supported by the boom 53. Figure 8, which is a cross-section taken in a vertical plane, illustrates that the boom 53 is a tubular-member whose axis is parallel to the top plane-surface of the base 45. Figure 6 illustrates that the axis of the boom is also exactly 90 degrees to the axis of the tubular-support 48.

The end of the boom, farthest from the boom-slide, integrally supports a bearing 55. This bearing rotatably supports one end of a second flux-interrupter shaft, 56, similar to shaft 50. The other end of the flux-interrupter shaft 56, whose axis is parallel to the axis of the boom 53, is integral to and is rotatably supported by the low-speed shaft (not shown) of a speed-reducer 57. The exterior housing of this speed-reducer is rigidly supported by the bracket 58 which is an integral part of the boom-slide 52, (see Figure 8).

The cross-head 54 has, as may be seen by study of Figure 8, an integral extension which terminates in a stylus 59 and a bracket 60. The tip of the stylus 59, is brought to a sharp, hardened point which clears the plane-surface of the base 45 by a few thousandths of an inch. The bracket 60, extends upwardly and rigidly supports a permanent-magnet 61 which is identical in all respects to the magnets 25 and 38 illustrated by Figure 13 and already completely described. A coil 62, consisting of thousands of turns of enameled copper wire, identical to the coils 26 and 39 used in conjunction with the magnets 25 and 38, Figure 13, is pressed on one end of the magnet 61. This end is reduced in size and, by referring to Figures 7 and 8, it will be seen that this end terminates in a wedge-like tip 63. This tip clears the highest points of the threads, cut along the length of the flux-interrupter shaft 56, by three or four thousandths of an inch. It will be understood that the axis of the magnet 61 and the axis of the flux-interrupter shaft 56 occupy the same horizontal plane.

The flux-interrupter shaft 56, a broken length of which is shown in plan by Figure 7, and illustrated in cross-section by Figure 8, is made of soft steel or iron, having a very low magnetic-retentivity. The specific shaft, illustrated by Figures 7 and 8 has quadruple-threads, continuously extending along substantially its entire length. These threads are right-handed, as may be seen from Figure 7, and will be considered to have a pitch of 4 threads per inch.

The threads are not of orthodox V or "acme" form but may be likened to four parallel cords or wires wrapped around a cylinder with each of the cords circular in cross-section and of the same identical diameter.

The purpose of the threads, cut along the lengths of the two flux-interrupter shafts 50 and 56, illustrated in Figure 6 and also illustrated in Figures 7 and 8, is identical to the use to which the high-points or lobes of the tone-wheel, illustrated by Figure 5, are put; namely to serve as a means of interrupting the magnetic-flux flowing from the end of the permanent-magnet by periodically changing the length of the air-path through which the magnetic-flux must pass.

The interrupter shaft 56 is rotated, by a suitable motor (not shown), at exactly 15 R. P. S. in a clock-wise direction when viewing the shaft along its axis and looking towards the speed-reducer 57. This direction of rotation is shown by Figure 8. Rotation of the flux-interrupter shaft in a clock-wise direction will cause the threads to progressively pass by the wedge-like tip 63, of the permanent magnet in a direction towards the end of the boom 53. This direction is illustrated by an arrow, Figure 7, which, as stated, is a view taken in plan of a section of the flux-interrupter shaft 56.

The threads, cut along the length of the interrupter shaft 56, are, as stated, of quadruple pitch. Therefore, 4 threads will pass the wedge-end or tip 63, per complete revolution of the flux-interrupter shaft. The rate of rotation of this shaft is, as stated, 15 R. P. S. Thus, 4×15 or 60 threads will pass the tip 63 of the magnet 61, per second, in the direction indicated by Figure 7.

The air-gap, between the magnet-tip 63 and the flux-interrupter shaft 56, will therefore be continuously varied from three-thousandths of an inch to say, one-tenth of an inch (dependent upon the depth of the threads) at a rate of 60 times per second to inductively build up a 60 C. P. S. alternating-current, within the windings of the pick-up coil 62.

However, the frequency of the alternating-current, inductively built up within the windings of the pick-up coil 62 will be 60 C. P. S. only when the cross-head 54 is stationary in relation to the boom 53. Thus, if the cross-head 54, is moved in the direction of the arrow, Figure 7, fewer threads will pass by the magnet-tip 63 in one second to produce an alternating-current having a frequency less than 60 cycles/sec. within the windings of the pick-up coil 62.

Obviously a displacement of the cross-head 54 in a direction opposite to the direction indicated by the arrow, Figure 7, will cause an alternating-current whose frequency is greater than 60 cycles/sec. to be inductively built up in the pick-up coil 62.

The flux-interrupter shaft 56 coacts electromagnetically with a pick-up coil 63, mounted on the end of a permanent-magnet 64, which in turn is rigidly fastened to the boom-slide 52 by a bracket (not shown), integral to the boom-slide in the same manner that the bracket 60, is integral to the cross-head 54. It will be understood that the flux-interrupter shaft is driven at the same speed and is substantially identical to the interrupter-shaft 56 and that the pick-up coil 63 and permanent-magnet 64 are identical in physical form and in their functioning to the pick-up coil 62 and the permanent-magnet 61 illustrated by Figures 7 and 8.

Figure 8 illustrates that the output of the pick-up coil 62 is led to the two conductors 67 and 68. In the event the translator illustrated by Figures 6, 7 and 8, is used instead of the translator illustrated by Figures 1, 2, 3 and 4 it will be understood that two conductors electrically connected to coil 63 serve as the current input to the longitudinal-control amplifier 70, Figure 13, and that the two conductors 67 and 68, Figure 8, are led to the lateral-control amplifier 71, Figure 13.

Although the translator illustrated by Figure 6 utilizes a slightly different method in frequency-generation than that used by the translator illustrated by Figures 1 and 2, the net result obtained by its use is the same.

Figures 9, 10, 11 and 12 show a third method of generating a control alternating-current in such a manner that the frequency of the current is caused to differentially vary, above or below a fixed or base-frequency (such as 60 C. P. S. for example), in exact direct response to the direction, rate and magnitude of the displacement of a stylus.

Figure 9 is a plan view of a boom 75 whose function is identical to the functioning of the boom 6, Figure 1, and the boom 53, Figure 6, namely, to act as a slidable support for the cross-head 76 and also to serve as a mounting for a frequency-generator which will now be described.

A speed-reducer 77, Figures 9 and 10, is directly connected to a fractional horsepower motor 78 which is of synchronous type and is supplied with alternating-current from preferably a commercial source through the leads 79 and 80. Figure 10, which is taken in plan, illustrates that the axis of the motor is in a horizontal plane and that the low-speed shaft 81 of the speed-reducer 77 is vertical. The angular velocity of the vertical shaft 81 will, for purposes of illustration, be taken to be exactly 1 R. P. S. in a clock-wise direction as illustrated by Figure 10. A driving-pulley 82 is pressed on integral to the low-speed shaft 81. The flat face of this pulley is exactly 6.000 inches in circumference. A very thin and flexible ribbon of brass, steel or bronze serves as an interrupter-belt 85, which extends from the driving-pulley 82 to the idler pulley 83, Figure 9, which is rotatably supported by a vertical shaft 84, integral to the boom 75.

Figure 12 illustrates a section of the ribbon which makes up the interrupter-belt 85. It will be noted that a series of rectangular equi-distant openings, 88, are cut out near one edge of the ribbon. The width of each opening or slot is exactly .050 inch. The slots are separated from each other by a distance of also .05 inch. Therefore every inch of ribbon has 10 equi-distantly spaced slots. Sprocket holes 87, are punched along a line parallel to the edges of the interrupter-belt 85. These holes register with driving pins 90, which extend radially from the face of, and are integral to, the driving-pulley 82. The function of these pins is to drive the endless interrupter-belt 85 without slippage, at a linear velocity of exactly 6.000 inches per minute, it being remembered that the circumferences of the driving-pulley 82 is 6.000 inches and that it is continuously revolved at the rate of 1.00 R. P. S.

A substantially light-tight compartment, 91, is integral to the cross-head 76. The compartment has two opposite slots (see Figure 11), in register with one strand of the interrupter-belt so that the strand can be continuously and frictionlessly drawn through the approximate middle of the compartment 91 when viewed in plan.

Figure 11 which is a vertical section taken through the compartment 91, illustrates a source of luminosity, preferably a direct-current, pre-focused lamp, 92, and a photo-electric cell 93. The light-flux, emitted by the lamp 92, is concentrated into a light-pencil whose cross-sectional area is identical to the slots 86, cut in the belt 85. The light-flux, as illustrated by Figure 11, passes from the lamp in a left-to-right direction (as viewed in this figure), and falls on the light-sensitive area of the photo-electric cell 93. The belt 85 is so positioned, in relation to the lamp 92 and the photo-electric cell 93, that practically the full luminosity of the lamp will fall upon the photo-electric cell when one of the slots, 88, is in register with the light-pencil, while substantially zero light-flux will fall upon the photo-electric cell 93, when the belt 85 is drawn or advanced exactly .050 inch from the position first described.

The function of the interrupter-belt 85 therefore is to serve as a means for controlling or "valving" the light-flux, falling upon the photo-electric cell, from maximum to zero and back to maximum again in a periodic manner.

The interrupter-belt 85, as stated, has 10 slots per inch and is drawn through the compartment 91 at the rate of 6.000 inches per second when the cross-head 76 is stationary in relation to the boom 75. Thus, 10 × 6 or 60 slots per second, would come into register with the light-pencil to cause the luminosity, falling upon the photo-electric cell to be occulted 60 times and thereby cause the electrical resistance of the photo-electric cell 93 to pass from zero to maximum, 60 times per second, which, with suitable amplification and transformation, would produce an alternating-current whose frequency would be exactly 60 C. P. S.

Now assume that the cross-head 76 is displaced in the direction of the speed reducer 77 (or in a direction from the bottom to the top of Figures 9 and 10), it will be seen that the interrupter-belt 85 will be drawn through the compartment 91 at a reduced linear velocity, the reduction in velocity depending on the rate of movement of the cross-head 76.

Now if the cross-head 76 be moved in the opposite direction (along the boom 75 away from the speed-reducer 77) a greater number of slots will come into register with the light-flux per second to produce a higher frequency current in the photo-electric cell's circuit.

It will be seen that the system of frequency generation just described, whose essential members are illustrated by Figures 9, 10, 11 and 12, although totally different in the instrumentalities used, produces the same result as the system utilizing tone-wheels illustrated by Figures 1, 2, 3, 4 and 5, and the system utilizing the flux-interrupter shafts, illustrated by Figures 6, 7 and 8. This result is the generation of an alternating-current whose frequency will vary above or below a 60 cycle base-frequency, for example, in direct, continuous and instantaneous response to the direction and rate of displacement of any member such as a stylus or follower.

The cross-head 76, Figures 9 and 10, has an integral stylus 94, which may be considered identical to the stylus 59, Figure 8. Although, for purposes of simplicity, but one frequency-generator (which would generate a variable frequency alternating-current in response to the lateral displacement of the cross-head 76) has been shown, it will be understood that a second or longitudinal-control frequency-generator, varying the frequency of a second alternating-current by the longitudinal displacement of the boom 75 along the length of the tubular-support 95, could be arranged by the addition of a second light-tight compartment (similar to compartment 91) a second interrupter-belt (similar to belt 85) with its attendant drive. It will of course be understood that the second compartment would be integral to the boom-slide 96, while the strands of the second interrupter-belt would be parallel to the axis of the tubular-support 95.

In carrying out the invention, a frequency recording system which is capable of simultaneously recording the frequencies of the longitudinal-control, the lateral-control and the base frequency alternating-current in such a manner that, at any selected future time, these frequencies may be recreated or regenerated to reproduce the base-frequency and precisely the frequencies of the longitudinal-control and the lateral-control alternating-current which would be identical to the frequencies produced if the stylus was actually caused to be moved through a certain spatial path about the configurations of a pattern or template lying in a single plane.

The feeble alternating-current output of the longitudinal-control pick-up coil 39, is led to an amplifier 70 through two conductors 101 and 102 while the amplifier 71 is supplied with the low-power, alternating-current output of the lateral-control pick-up coil 26, through the two insulated leads 103 and 104. The function of the identical amplifiers 70 and 71, is to separately amplify the out-puts of the pick-up coils 39 and 26 (whose current out-puts are in the nature of a few microwatts) to alternating-currents whose energies are several watts or sufficiently great to operate electro-magnetic recording-coils 105 and 106 of an electro-magnetic recording-head 107. It will be noted that a third electro-magnetic recording-coil 108 is also carried by the recording-head 107. The coil 105 is in electrical connection with the longitudinal-control amplifier 70 through the two conductors 108 and 109, the coil 106 is connected to the lateral-control amplifier 71 by the two conductors 110 and 111 while coil 108 is in direct connection with the commercial source of 60-cycle alternating-current through the two leads 112 and 113. This 60-cycle alternating current is utilized as the base-frequency of the frequency generating and recording system.

The recording system per se, illustrated at the right of Figure 13 is of the well-known electro-magnetic type. A storage reel 114, seen in the upper right-hand corner of Figure 13, serves as a magazine for a ribbon of special steel which may be upwards to one or two thousand feet in length. The ribbon or tape is preferably some .0020 inch in thickness and from ¼" to ⅜" in width. The steel is of special composition and has the very high magnetic retentivity found in permanent-magnets.

The reel 114, holds the ribbon or tape 115 before it has been magnetized by the separate influences of the coils 105, 106 and 108. A small electric motor 116, drives the windup-reel 117 in a counter-clockwise direction through the chain or belt 118. It will be noted that motor 116 receives its electrical current from the commercial source of 60-cycle alternating-current which also supplies power to the stators 11 and 34 of the frequency-generators.

Although not illustrated by Figure 13, it will be understood that the revolutions of the reel-driving motor 116 are controlled in such a manner that the steel tape is advanced from the storage-reel 114 downwardly (as viewed in Figure 13) through the recording-head 107 to the driving-reel at a uniform rate of, for example, 10 feet per minute. The recording coils 105, 106 and 108 are arranged to produce three parallel frequency recording tracks on the steel tape.

Inasmuch as recording audio-frequencies on steel tape by electro-magnetism is well known and does not constitute the invention per se, it is not considered expedient to go into a minute description of such a frequency-recording system.

It will be distinctly understood that although electro-magnetic recording on magnetic-retentive material, such as steel tape, has been illustrated and described in this disclosure, other types of frequency or signal recording devices can be used in the system of machine-tool control constituting this invention.

The function of the translator and the frequency-recording system, illustrated and fully described up to this point in this disclosure, is twofold. The first function, that of the translator, is to translate any pattern or out-line, lying in a single plane, such as the edge of a template or form, a penciled outline or any similar discernible path, into a longitudinal control, alternating-current and a lateral-control alternating-current whose frequencies are simultaneously and continuously varied above or below a datum or base frequency (such as 60 C. P. S. which has been used in this disclosure for purposes of illustration) by amounts proportional to the direction and rate of the simultaneous longitudinal and lateral displacements of a stylus as it is caused to be moved about the pattern, such as the edge of the template.

Referring to Figs. 14 and 15, there is shown a power-unit for operating the lead-screw of a tool machine in accordance with the frequencies reproduced from the record tape 115, by mechanism to be described hereinafter, so that the movement of a part of the tool mechanism relative to one axis of an X—X, Y—Y axis system will correspond to the movements of the stylus relative to a corresponding axis of an X—X, Y—Y axis system when the record was made.

The power-unit consists of the electrical elements of two synchronous motors whose respective rotors are geared together. The lower part of the main housing 125 (seen at the lower part of Figure 14) encases a 60-cycle, 6-pole, single-phase, 1200 R. P. M. synchronous motor. The upper part of the housing 125, encases a "high-cycle," 6-pole, single-phase synchronous motor, whose stator and rotor are designed to work efficiently when the stator field-winding 126 is supplied with an alternating-current whose frequency varies from 200 C. P. S. to 400 C. P. S.

The upper part of the main housing 125 is bored out to receive the "high-cycle" field-winding 126 which is securely pressed into the bore. Two leads, 127 and 128 are electrically connected to the field-winding 126, and serve as conductors for the energizing alternating-current supplied from an amplifier (not shown in Figures 14 and 15). A rotor 129, which co-acts electrically with the field-winding 126, is mounted on two anti-friction ball-bearings 130 and 131. The outer-race of bearing 130 is rigidly supported by a counterbore cut in the main housing 125. The bearing is closed off by the end-plate 132. The outer-race of ball-bearing 131 is rigidly supported by a bore cut in the diaphragm-plate 133 between the motor-housing 125 and the gear-housing 140.

The left-hand end of the rotor shaft is press-fitted with the pinion 134 which has, for purposes of illustration, 20 teeth.

A 100-tooth gear 135 of the same pitch as pinion 134 is press-fitted on the rotor-shaft 136. The gear-reduction is thus 100:20 or 5:1 between the pinion 134 and the gear 135. The rotor-shaft extends through the rotor 137, and terminates at the rotor's right-hand face. This rotor 137, is press-fitted on the rotor-shaft 136 and therefore is in integral assembly with the shaft and the gear 135. The rotor is thus overhung from the diaphragm plate 133. Two bearings of ball-type, 138 and 139, rigidly support the gear 135, which is carried between them, and the over-hung rotor 137. The bearing 138, which rotatably supports the end of the rotor-shaft, has its outer-race pressed into a bore cut in the gear-housing cover 140 while the outer-race of the ball-bearing 139 is pressed into a bore, provided for it, in the diaphragm-plate 133.

A field-winding 141 (which is six-pole and identical electrically with a similar winding of a 60-cycle, single-phase, six-pole, 1200 R. P. M. synchronous motor of the same size) is press-fitted into a field-winding housing 142. The field-winding housing is an integral part of the power-shaft 143 and is perfectly concentric to the power-shaft's axis. The housing 142 is mounted in an over-hung position in relation to the power-shaft 143. Two massive ball-bearings 144 and 145 rigidly and rotatably support the power-shaft and its over-hung, field-winding housing 142. The outer-race of the ball-bearing 144 is securely pressed into a bore arranged for it in the main-housing 125 while the outer race of the ball-bearing 145 is mounted within the circular slip-ring cover 146 which is securely mounted as an integral part of the main-housing 125.

Two electrical-leads 146 and 147 (shown by dotted lines in Figure 14), are in circuit with the field-winding 141 and separately extend as shown, through a bore in the power-shaft 143 to the two slip-rings 148 and 149. The slip-rings which are made of bronze or like material are to be understood to be electrically insulated from the power-shaft 143 by means of a Bakelite or similar non-conducting sleeve (not shown) which is interposed between the shaft diameter and the inner diameters of the two concentric slip-rings. As will be noted from Figure 14, the electrical-lead 146 is electrically bonded to slip-ring 148 while the remaining lead 147 is similarly bonded to slip-ring 149. Two carbon-brushes 150 and 151 bear against the slip-rings 148 and 149 respectively. The carbon-brushes are spring-loaded (not shown) so that one end of each brush is in intimate electrical contact with a slip-ring. A lead 152 is bonded to the brush 150 while lead 153 is similarly attached to the brush 151. These two leads as may be seen by referring to Figure 14, supply current to the field-winding 141, from a commercial source of 60-cycle alternating-current.

As viewed from the right of Fig. 14, the "high-cycle," rotor 129, will always rotate in a counter-clockwise direction and the 60-cycle, rotor 137, will always rotate in a clockwise direction at one fifth the angular velocity of the "high-cycle" 129, due to the gear-reduction.

It will be understood that the 60-cycle field-winding 141 is supplied with the 60-cycle alternating-current through the supply leads 152 and 153. It will be further understood that the polarity-connection of these leads to the field-winding 141 is such that the 60-cycle rotor is continuously driven at an angular rate of exactly 1200 R. P. M. in a clockwise direction in relation to its electrically co-acting field-winding 141. It should also be clearly understood that the 60-cycle field-winding 141, the field-coil housing 142 and the power-shaft 143 function as an integral unit which is capable (under certain frequency conditions of the "high-cycle" alternating-current) of rotation either in a clockwise or counter-clockwise direction.

The functioning of the power-unit is as follows: A high-frequency current is supplied to the "high-cycle" field-winding 126 through the two conductors 127 and 128 while 60-cycle, alternating-current is continuously supplied to the 60-cycle field winding 141, from a commercial source of 60-cycle current. The frequency for the current supplied to the "high cycle" field-winding should be such that the rotor 129 will be driven at five times the speed of the rotor 137. This frequency may be referred to as the normal frequency and in the motor described, that frequency is 300 C. P. S. The motor has three pairs of poles so its speed will be 6000 R. P. M. when supplied with 300 C. P. S. frequency current.

Under these conditions, the 60-cycle field-winding and thus the power-shaft 143, integral to it, would be held stationary because the rotor 137 will always rotate relative to the winding at a fixed rate. In fact it would not only be held stationary but the 60-cycle field-winding 141 will set up a resistance to any force, tending to rotate its integral power-shaft.

Now assume, that alternating-current of a still higher frequency is supplied to the "high-cycle" field-winding 126 of the power-unit, the "high-cycle" rotor 129, would be driven at a higher rate which would increase the rate of clockwise rotation of the 60-cycle rotor 137 through the gears 134 and 135. Since the relative velocity of the 60-cycle rotor, in relation to its electrically-coacting 60-cycle field-winding 141, is, at all times, constant and in a clockwise direction it will be seen that the 60-cycle field-winding 141 and its integral power-shaft 143 will rotate at an angular velocity of ⅕ of the increase of velocity of the rotor 129 and in a clockwise direction.

It will now be assumed that the frequency of the "high-cycle" alternating-current, supplied to the "high-cycle" field-winding 126, be gradually reduced from above to below the normal frequency for the "high-cycle" winding 126. This causes a reduction in speed of the rotor 137 below that maintained between it and its field winding 141, and since the electrical inter-action between the 60-cycle field-winding 141 and the 60-cycle rotor 137 always produces a constant R. P. M. clockwise rotation of the rotor in relation to the field-winding, the field-winding will be rotated in a counterclockwise direction at a rate of ⅕ the decrease in rate of the rotor 129 from its normal-frequency rate.

Figure 16 illustrates an engine-lathe in plan along with the electrical units and circuits necessary for the automatic control of such a tool in response to certain frequencies which have been recorded by electro-magnetic impressions on steel tape which serves as a control-record. A frequency "play-back" or reproducing system is schematically illustrated at the left-hand side of Figure 16.

A reel 160 serves as a magazine for the steel tape upon which the necessary "frequency-patterns" have already been electro-magnetically impressed by the frequency recorder illustrated in Figure 13. A driving-reel 161 is rotated in a clockwise direction as viewed in Figure 16 which causes the control-record or steel-tape 162 to be continuously fed downwardly through the reproducing-head 163 at a linear velocity of approximately 10 feet per minute. The driving-reel 161 is driven through a chain 191 by a fractional-horsepower motor 164, which receives its energizing current from the commercial source of 60-cycle alternating-current shown in Figure 16.

The reproducing-head 163 is identical to the recording-head 107 illustrated in Figure 13. In fact these two heads can be used interchangeably if desired; that is, either for recording frequencies or for their reproduction. The pole-pieces (not shown) of the pick-up coil 165 are in register with a very narrow section extending continuously along the length of the tape 162 upon which longitudinal-control frequencies have been electro-magnetically impressed.

The pole-pieces (not shown) of the pick-up coil 166 bear slightly against a second section or track which is separate but parallel to the longitudinal-control frequency-track. The base-frequency is impressed upon this second track. The lateral-control frequencies, electro-magnetically impressed upon a third parallel track, separate from the first and second tracks are recreated by the inductive action within the windings of the pick-up coil 167.

The pick-up coils are thus used to reproduce the longitudinal control frequency, the lateral control frequency and the base-frequency which have been simultaneously recorded on separate adjacent parallel tracks of the control-tape 162.

The output of the pick-up coil 165 is led to the amplifier 168 by the two conductors 169 and 170. The amplifier 171 is supplied with the output of the pick-up coil 166 through the two leads 172 and 173 while the output of the last pick-up coil 167 is led by the two conductors 300 and 301 to the amplifier 176. Since the inputs to the amplifiers 168, 171 and 176 are substantially of identical magnitude and the outputs of these amplifiers are also similar, they will be considered to be identical in construction.

Three identical synchronous motors 177, 178 and 179 are separately supplied with the alternating-current outputs of the three amplifiers 168, 171 and 176 respectively. The motor 177 receives its alternating-current through the two leads 180 and 181. Alternating-current is conducted from the amplifier 171 to the motor 178 through the two leads 182 and 183 while the output of the amplifier 176 is led to the synchronous motor 179 through the two leads 184 and 185.

In the present disclosure of the invention the three similar synchronous motors, 177, 178 and 179 are single-phase, uni-directional, self-starting, 60-cycle motors having 4 poles. Their synchronous speeds would thus be exactly 1800 R. P. M. when their field-windings are supplied with 60-cycle alternating-current. Their speeds vary, however, according to increases and decreases in frequencies of currents supplied to them.

Figure 23:
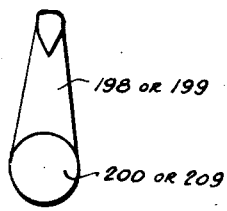
Figure 23 illustrates a flux-interrupting member used in apparatus illustrated by Figure 16.
Figure 24:
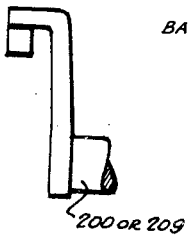
Figure 24 is a further illustration of the member appearing in Figure 23.

Inspection of Figure 16 discloses the fact that the rotor-shaft 186 of the motor 177 and one end of the rotor-shaft 187 of the motor 178 are connected to the two driven shafts of a mechanical differential 188. A tone-wheel 196 is concentrically mounted on the end of the differential shaft 194. A cylindrical permanent-magnet, 200, made of cobalt steel or similar material is rotatably supported by two ball-bearings 203 and 204. The end of the magnet 200, furthest from the bearing 204 terminates in an interrupter-arm 199, made of soft steel and integral to the magnet 200. Figures 23 and 24 illustrate this interrupter-arm in detail.

The permanent-magnet 200 is rotated counterclockwise (as viewed from the right hand side of Fig. 16) by a synchronous motor 208 which is supplied with 60-cycle alternating current from preferably a commercial source of current through the two leads 219 and 220. A gear 205 made of brass or a similar non-ferrous material is mounted integral to the permanent magnet 200. This gear is in mesh with a pinion 207 affixed to the end of the rotor-shaft of the motor 208. A stationary pick-up coil 201, consisting of thousands of turns of fine enameled copper wire surrounds part of the length of the rotatable permanent-magnet 200.

The rotor-shaft 187 of the synchronous motor 178 is connected to one driven-shaft of a mechanical differential 190 which is identical to the differential 188. One end of the rotor-shaft 189 of the synchronous motor 179 is connected to the other driven-shaft of the differential 190. A second tone-wheel 197 identical to the tone-wheel 196 is mounted on the end of the differential shaft 195.

A second rotatable, permanent-magnet 209, identical in all respects to the magnet 200, is rotatably supported by the two ball-bearings 210 and 211. A pick-up coil 212 similar to coil 201 surrounds part of the length of the magnet. A brass gear 206, similar to the gear 205, is concentrically mounted on the permanent magnet 209. This gear is in mesh with the pinion 207, mounted on the end of the rotor-shaft of the synchronous motor 208 so that the magnet 209 is driven in the same direction and rate as magnet 200. An interrupter-arm 198, serving as a flux-path and identical to the arm 199, is securely fastened to one end of the permanent magnet 209. Figures 23 and 24, illustrating the interrupter-arms 198 and 199 in detail, show that the arms terminate in wedge-ends. Preferably these wedge-ends or tips of the interrupter-arms clear the highest points of the 20 lobes cut about the circumferences of the tone-wheels 196 and 197 by some .002 of an inch. Thus, alternating currents are generated in the coils 201 and 212 when the magnets 200 and 209 are rotated relative to the tone-wheel 196 and the frequency of the current will depend upon the relative rates of rotation of the tone-wheels and magnets and the number of lobes on the tone-wheels. In the present disclosure the tone-wheels have 20 lobes and the motor 208 rotates the magnets at 15 R. P. S. when supplied with a 60-cycle current. This produces an alternating current having a frequency of 300 cycles per second when the tone-wheels are stationary.

Study of Figure 16 shows that the output of the stationary pick-up coil 201 is fed to a power-amplifier 218 through the two leads 213 and 214 while the output of the stationary pick-up coil 212 is led to the power-amplifier 217 through the two conductors 215 and 216. The power-amplifiers 217 and 218 are capable of amplifying the low-magnitude alternating-current outputs of the pick-up coils 212 and 201 respectively, to two alternating-currents whose magnitudes are, for purposes of description, in the order of 400 or 500 watts. These amplifiers are further designed to efficiently amplify alternating-currents whose frequencies vary between 200 to 400 C. P. S.

The 400 to 500 watt alternating-current output of the power-amplifier 218 is led to the "high-cycle" winding of the power-unit 230 through the two leads 231 and 232 while the output of the power-amplifier 217 is led to the "high-cycle" winding of the power-unit 233 through the two leads 234 and 235. 60-cycle alternating-current is supplied to the 60-cycle field winding of the power-unit 230 through the two leads 236 and 237, while 60-cycle alternating-current is led to the 60-cycle field winding of the power unit 233 through the leads 238 and 239.

It will be noted from Figure 16 that the drive-motor 208 and the 60-cycle field-windings of the two power-units 230 and 233 receive 60-cycle alternating current from a common source which is preferably a commercial power supply. The drive-motor 164 of the electro-magnetic frequency-reproducer is also supplied with similar 60-cycle current from the same source through the two leads 240 and 241.

The lateral-control power-unit 233 is rigidly fastened to the back of the carriage 242 of the engine-lathe which is shown in plan in Figure 16 and in elevation in Figure 17, and the power-shaft of this power-unit extends outwardly from its housing and mechanically drives a lead-screw 244 through a 5:1 gear reduction (not shown). The lead-screw 244 will be considered to have, for purposes of description, right-hand threads of a pitch of 8 per inch. Rotation of this lead-screw controls the magnitude and direction of movement of the tool-slide 245.

The lead-screw 246, whose rotation controls movement of the carriage 242 along the length of the lathe, is mechanically driven through a 5:1 gear reduction (not shown) whose high-speed shaft is direct-connected to the power-shaft of the longitudinal control power-unit 230. This power-unit is rigidly mounted at the right-hand end (as viewed in Figures 16 and 17) of the lathe bed. The lead-screw 246, is similar to the screw 244, in that its threads are right-hand and that the pitch is 8 to the inch.

With the exception of the automatic electrical control of the two lead-screws the engine-lathe illustrated in Figures 16 and 17 may be considered to be of orthodox design having a conventional change-speed gear box 249, a chuck 250 and tail-stock 251.

Figure 25:
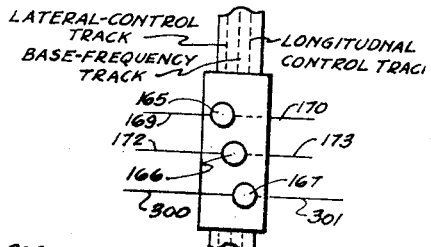
Figure 25 illustrates a recording and reproducing head utilized by the recording equipment illustrated by Figures 13 and 16.

Energization of the drive-motor 164 causes the control tape 162 to be carried in a downward direction (as seen in Figure 16) through the reproducing head 163. Figure 25 is a front view of the reproducing head and also illustrates a small section of the control tape 162. It will be noted that the three pick-up coils 165, 166 and 167 are staggered. The three parallel dotted lines indicated along the length of the control tape 162 in this figure schematically represent the three parallel frequency-tracks which have been electro-magnetically impressed on the narrow steel ribbon, constituting the control-tape 162. It will of course be understood that these electro-magnetic impressions have been recorded on the tape by the translator frequency-generating and recording equipment illustrated by Figure 13.

Movement of the control-tape 162 downward through the reproducing-head 163, Figure 16, causes the three pick-up coils 165, 166 and 167 to inductively generate three separate alternating-currents of very low magitude.

The longitudinal-control electro-magnetic impressions 302, Figure 25, after being inductively converted into an alternating-current by the action of the longitudinal-frequency pick-up coil 165 is amplified by the amplifier 168 whose alternating-current output is fed to the windings of the synchronous motor 177. Similarly, the output of the lateral-frequency pick-up coil 167, after necessary amplification by the amplifier 176, is led to the windings of the synchronous motor 179.

The base frequency, electro-magnetic impressions are converted to an alternating-current by the action of the base-frequency pick-up coil 166 and then directed to the power-amplifier 171. The output of this amplifier is led to the windings of the synchronous motor 178, which, as stated, and by examination of Figure 16, will be seen to be mechanically connected to both of the mechanical-type differentials 188 and 190.

Preferably, the gearing within the housing of the differential 188 is such that the differential-shaft 194 will rotate in a clockwise direction (when standing at the end of this shaft and looking toward the differential-housing) when the frequency of the longitudinal control alternating-current fed to motor 177 is greater than the 60-cycle base-frequency alternating-current continuously supplied to the constant-speed motor 178 and at a rate of 1 R. P. S. for each cycle per second in excess of the base-frequency. Similarly this differential-shaft will rotate counterclockwise when the frequency of the longitudinal-control alternating-current is less than the base-frequency alternating-current continuously supplied to the motor 178 from the amplifier 171 and at a rate of 1 R. P. S. for each cycle per second below the base-frequency.

The rate and direction of the rotation of the differential-shaft 195 of the differential 190 is controlled by the frequency-differential existing between the frequency of the lateral-control alternating-current supplied to the synchronous motor 179 from the amplifier and the base-frequency alternating-current supplied to the motor 178 from the amplifier 171 in precisely the same manner that the rate and direction of rotation of the differential-shaft 194 is controlled by the frequency-differential existing between the base frequency and the frequency of the longitudinal control current which has just been fully described.

By recording the base-frequency simultaneously with the control frequencies and operating the differential mechanisms according to the difference in frequencies between the base-frequency and the control-frequencies, the extents or magnitudes of movements of the stylus with respect to the X—X and Y—Y axes can always be reproduced although the linear speed of the recording tape may be varied in the "play-back" from that at which the record was made.

The tone-wheel 196 is stationary when the frequency of the longitudinal-control alternating-current is exactly the same as the base-frequency and the pick-up coil 201 will inductively build up an alternating-current of 300 C. P. S. frequency the normal frequency for the power-unit 230.

Correspondingly, the output of the coil 212 will also be a 300 C. P. S. alternating-current at such times as the tone-wheel 197 is stationary. This static condition of the tone-wheel would obviously be due to the frequency of the lateral-control alternating-current, supplied from amplifier 176 to the motor 179, being exactly the same as the base-frequency.

As stated earlier in this description of the frequency reproducing and regeneration system illustrated by Figure 16, the tone-wheel 196 will rotate in a clockwise direction at the rate of 1 R. P. S. for each C. P. S. that the frequency of the longitudinal-control alternating-current is in excess of the base-frequency. Since the interrupter-arm 199, integral to the rotating permanent-magnet, is continuously rotated at the rate of 15 R. P. S. by the synchronous motor 208 in a counterclockwise direction, the relative angular velocity of the interrupter-arm, in relation to the tone-wheel 196, will now be 15 plus the clockwise R. P. S. of the tone-wheel. This causes 20 additional tone-wheel high-points or lobes to pass by the wedge-tip of the interrupter-arm 199 per second for each clockwise R. P. S. of the tone-wheel.

Conversely, as has already been brought out, the tone-wheel 196 will rotate in a counterclockwise direction at the rate of 1 R. P. S. for each cycle per second of the longitudinal control current less than the base-frequency and since the interrupter-arm 199 rotates in a counterclockwise direction at the rate of 15 R. P. S. and the tone-wheel 196 is rotated in the same direction the relative velocity between these two members will be 15 less the R. P. S. of the tone-wheel.

The variable speed motor 17 which is supplied with the longitudinal-control alternating-current, the constant-speed motor 178 which is supplied with base-frequency alternating-current, the differential 188, the tone-wheel 196, the permanent magnet with its interrupter-arm 199, the pick-up coil 201 and the synchronous motor 208 which is continuously supplied with 60-cycle alternating-current (from a source common to the current supply to the 60-cycle windings of the two) may collectively be considered to be a high-cycle longitudinal-control frequency-regeneration system.

By means of the system, the 60-cycle base-frequency, which has been recorded on the control-tape 162 and reproduced by the pick-up coil 165, is regenerated as an alternating-current of 300 C. P. S. base-frequency. By means of this "high-cycle" frequency-regeneration system, 20 C. P. S. are added to the "high-cycle" base frequency of 300 C. P. S. for each 1 C. P. S. that is added to the 60-cycle base-frequency and 20 C. P. S. are subtracted from the "high-cycle" base-frequency of 300 C. P. S. for each 1 C. P. S. subtracted from the 60-cycle base-frequency.

The variable-speed motor 179 which is supplied with reproduced lateral-control alternating-current, the constant-speed-motor 178 which is supplied with the reproduced 60-cycle base-frequency alternating-current, the differential 190, the tone-wheel 197, the permanent-magnet 209 with its integral interrupter-arm 198, the pick-up coil 212 and the synchronous motor 208 (which is supplied with 60-cycle alternating-current from a source which also serves as a current supply for the 60-cycle field-windings of the two power-units 230 and 233) collectively regenerate a "high-cycle" lateral-control alternating-current whose base-frequency is exactly 300 C. P. S. This "high-cycle," lateral-control frequency regeneration system is identical in its functioning to the "high-cycle" longitudinal-control frequency-regeneration system fully described in the immediately preceding paragraphs.

The system of "high-cycle" frequency-regeneration just described makes possible the generation of "high-cycle" longitudinal-control and lateral-control frequencies from "low-cycle" control frequencies recorded on and reproduced from a control-tape in such a manner that although the rate, in C. P. S., at which the "high-cycle" control-frequencies are regenerated will vary in proportion to any change in the linear-velocity of the control-tape no overall frequency-error in the control-system is possible due to the control-tape being driven at varying rates.

Another highly important function of the "high-cycle" regeneration system, which has been described and which is schematically illustrated by Figure 16, is the increasing of the recorded-reproduced frequencies which are in the neighborhood of between 50 to 70 C. P. S., to frequencies in the neighborhood of from 200 to 400 C. P. S. Power-amplifiers such as 218 and 217 which are called upon to furnish 200 to 400-cycle alternating-currents in magnitudes of 500 watts or even 1000 watts can be built to operate in a very efficient manner compared to amplifiers designed to operate on 50 to 70-cycle alternating-current frequencies. 200 to 400-cycle amplifiers can also be designed to be very compact and inexpensive compared to equivalent low-frequency amplifiers.

The use of "high-cycle" synchronous motor elements such as rotors and field windings in the power-units (see Figures 14 and 15) is also made possible with the use of 200 to 400-cycle alternating-currents. The power-output of such "high-cycle" synchronous motors is tremendous when compared with 60-cycle synchronous motors of the same frame-size. For instance ½ H. P. 180-cycle synchronous motors are available whose diameter is in the neighborhood of 4 inches, whose length is but 5 inches and whose weight is some 7 or 8 pounds while ½ H. P. 400-cycle synchronous motors are built whose diameter is not in excess of 3 inches, whose length is not more than 4 inches and whose weight is not more than 5 or 6 pounds. The very large power-output of high-frequency synchronous motors allows the size of the servo-mechanisms or power units to be kept down in weight and also in size.

It will be understood that the user of the automatic machine-tool control system which constitutes the invention does not necessarily have to use a "high-cycle" frequency of from 200 to 400 cycles. If expedient a regenerated-frequency of from 400 to 800 cycles may be used if desired. In that event the tone-wheels 196 and 197 (Figure 16) would have 40 high-points or lobes cut about their circumferences instead of 20 lobes as have been used in the description. Or if it were desired, due to the availability of low-frequency synchronous motors which would operate in a frequency range of from 40 to 80 cycles, a regeneration of longitudinal-control and lateral-control alternating-currents in the frequency-range of from 40 to 80 cycles could be obtained by the use of tone-wheels having but 4 high-points or lobes.

Another exceedingly valuable result obtained by the use of the frequency-regeneration system illustrated in Figure 16 is the fact that a 60-cycle alternating-current synchronous motor rotor and field-winding, which are supplied with 60-cycle alternating-current from a commercial source of power, may be used in the power-unit in conjunction with a high-cycle synchronous motor rotor and field-winding. This makes the use of two-electronic-type power-amplifiers (such as amplifiers 217 and 218) per power-unit unnecessary as the 60-cycle synchronous motor field-winding receives its electrical energy, as stated, from a commercial 60-cycle power line.

Referring again to the power units 230 and 233, the coil 126 of unit 230 is supplied with alternating current from the amplifier 218 through wires 231 and 232 and coil 126 of unit 233 is supplied with alternating current from amplifier 217 through wires 234 and 235.

When the 60-cycle winding 146 of the power units are supplied with 60 cycle alternating current and the "high-cycle" coils 126 are supplied with 300 cycle alternating current, a condition which exists when the reproduced control frequencies are the same as the reproduced base-frequency, the drive shafts 143 of the power units will be motionless.

When the frequencies supplied to the "high-cycle" coils are increased above 300 C. P. S. the power shafts 143 rotate clockwise at a rate proportional to the increase of cycles per second and when the frequencies are decreased below 300 C. P. S. the shafts 143 rotate counterclockwise at a rate proportional to the increase in cycles per second, as explained hereinbefore. Thus, the tool or a carriage of a machine tool can be driven by the power-units 230 and 233 through their respective lead-screws to describe a path corresponding to the path of the stylus 15 when the frequencies were recorded on the tape.

In the event that the recording tape 162 is "played back" at a speed or speeds varying from that at which the record was made, the only effect will be that the rates of rotations of the power shafts 143 of the power-units 230 and 233 will be proportionally varied but the periods during which rotation occurs will be correspondingly varied so that the magnitude or extent of movement of the stylus 15 will be faithfully reproduced.

The system of "high-cycle" frequency-regeneration which has been described and which is illustrated by Figure 16 is as unaffected by changes in the frequency of the 60-cycle alternating-current, received from the commercial 60-cycle power line, as it is to changes in the speed at which the control-tape 162 is drawn through the reproducing-head 163. As stated, under normal conditions the two permanent-magnets 200 and 209 with their integral interrupter-arms 199 and 198 respectively are continuously rotated in a counterclockwise direction (when standing at the bearing-end of the magnet and looking towards its integral interruption-arm) at the angular velocity of exactly 15 R. P. S. by the fractional-horse power, synchronous motor 208. By alluding to Figure 16 it will be seen that this motor receives its 60-cycle alternating-current from exactly the same source that supplies the 60-cycle synchronous motor field-windings within the two power-units namely a commercial 60-cycle power-line.

By connecting the field windings 141 of the power-units 230 and 233 and the motor 208 in the same 60 cycle circuit, variations in the frequency in the line will not appreciably affect operation of the system. This is true because the frequencies of the currents supplied to the "high-cycle" field windings 126 are affected by the speed of motor 208. Thus, if the 60 cycle frequency in the commercial line varies 10%, for example, the frequencies supplied to the "high-cycle" coils will vary 10% from that cause and the relative speeds of the rotors 129 and 137 will be substantially unaffected.

For example, it will be noted that the outputs of the two "high-cycle" pickup coils were alternating-currents of 300-cycle frequency when the frequency of the alternating-current delivered to the 60-cycle windings of the power units 230 and 233 was precisely to 60 C. P. S. Therefore the ratio of the "high-cycle" alternating-current (delivered to the "high-cycle" windings of the two power units) to the 60-cycle alternating-current would be 300:60 or 5:1.

However when the frequency of the commercial 60-cycle alternating-current drops to 54 C. P. S. the frequency of the "high-cycle" alternating-current drops to 270 C. P. S. The ratio of the frequencies of these two alternating-currents is also 270:54 or 5:1. Thus the ratio of the frequencies of the "high-cycle" current to the "low-cycle" current is 5:1 regardless of whether the instantaneous frequency of the normally 60-cycle alternating-current used to energize the 60-cycle field-winding is 60 C. P. S. or 54 C. P. S.

Obviously, if desired, this frequency-regeneration system could be eliminated if the recorded lateral and longitudinal-control frequencies as well as the recorded base frequency were simultaneously reproduced, separately amplified by means of high output power-amplifiers and fed to the windings of a longitudinal-control power-unit and a lateral-control power-unit. In this event, the highly amplified reproduced base-frequency alternating-current would be impressed upon the 60-cycle field-winding 141 (Figure 14).

However, as stated, due to the cost, space-requirements, servicing and operating care of an extra high-output power-amplifier, it will, in many instances, be more expedient to impress commercially generated 60-cycle alternating-current directly on the 60-cycle field-windings of various power-units than to generate this current electronically.

Figure 26:
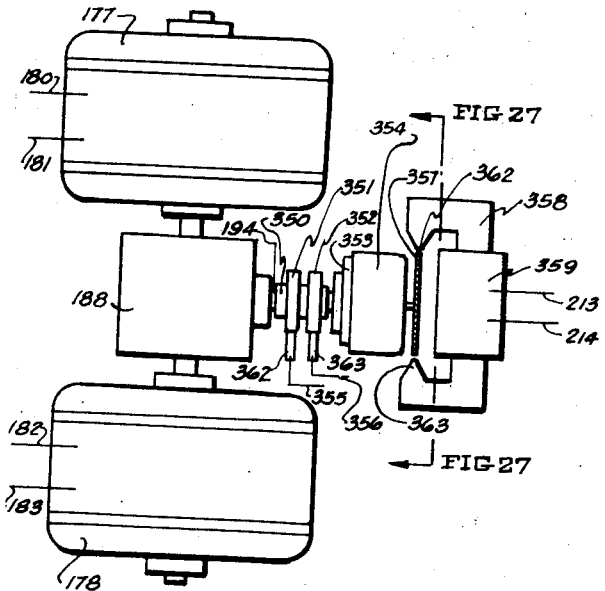
Figure 26 illustrates a species of frequency-generator which can be utilized in lieu of certain frequency-generators illustrated by Figure 16.
Figure 27:
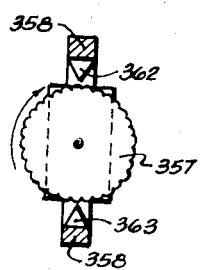
Figure 27 is a section taken through the device illustrated by Figure 26.
Figure 28:
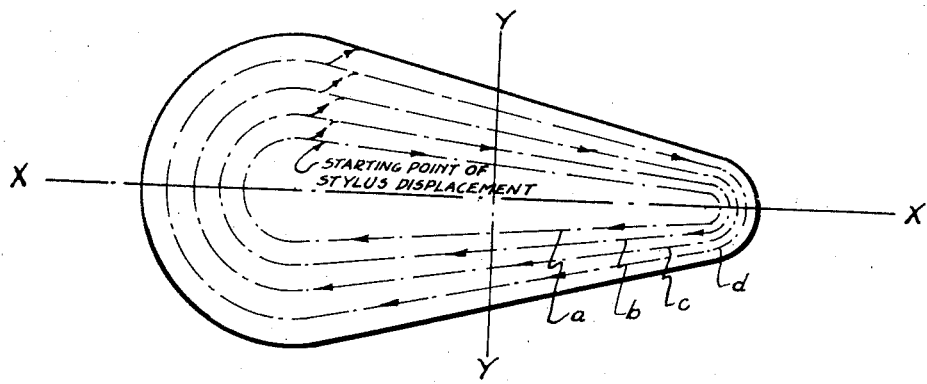
Figure 28 is a plan-view of a three-dimensional solid whose area has been marked in a special manner preparatory to its area being converted into a frequency-pattern.
Figure 29:
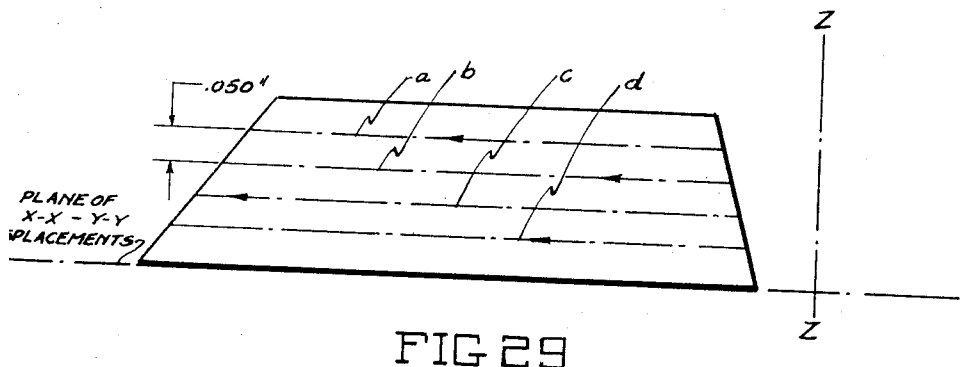
Figure 29 is an elevation of the three-dimensional solid illustrated in plan by Figure 28.

Figures 26 and 27 illustrate another species of "high-cycle" frequency regeneration system whose end-result is identical to either the "high-cycle" longitudinal-control or the "high-cycle" lateral-control frequency regenerator illustrated in Figure 16.

It will be assumed that the two synchronous motors of this frequency-regenerator are operated on the longitudinal-control alternating-current output of amplifier 168, Figure 16, and the base-frequency alternating-current output of the amplifier 171. It will be further assumed that the synchronous motors and mechanical-differential used in the frequency-regenerator illustrated by Figure 26 are identical both electrically and mechanically to the similar motors 177 and 178 and the mechanical-differential 188, Figure 16. For this reason the leads, motors and the differential will be identified by the same numbers used in identifying these elements in Figure 16.

The synchronous motor 177, Figure 26, will therefore be continuously supplied with longitudinal-control alternating-current from the amplifier 168 (Figure 16) through the two leads 180 and 181 while the synchronous motor 178 will be continuously supplied with base-frequency alternating-current from the amplifier 171 (Figure 16) through the two leads 182 and 183. The differential shaft 194 is fitted with a bushing, 350, of Bakelite or similar nonconducting material upon which two slip-rings 351 and 352 are pressed. The differential-shaft 194 is hollow (not shown) from the slip-ring 351 to the stator 353 of a 12-pole, 600 R. P. M. unidirectional-synchronous motor. The hollow section of the differential shaft serves as a conduit for two insulated leads (not shown). One end of one lead is electrically bonded to the slip-ring 351. One end of the other lead is similarly bonded to the slip-ring 352. The other ends of these two leads are electrically connected to the windings of the synchronous motor stator 353, which is rigidly and integrally mounted on the end of the differential-shaft 194 of the mechanical differential 188.

The synchronous motor consisting of the stator 353 and rotor 354 is to be understood as being identical to the synchronous motor consisting of the stator 34 and rotor 35 illustrated in Figure 13. Two carbon-brushes 362 and 363 which bear against the two slip-rings 351 and 352 respectively have 60-cycle alternating-current from a commercial source (from which the 60-cycle-rotors of the power-units 230 and 233, Figure 16, obtain their supply) delivered to them by the conductors 355 and 356.

A 30-lobe tone-wheel 357 is concentrically and integrally fastened to the end of the rotor shaft 354. A stationary permanent-magnet 358, of substantially the shape illustrated by Figure 26 coacts electro-magnetically with the tone-wheel 357. From Figure 27 which is a cross-section taken through the magnet in a plane adjacent to the tone-wheel it will be seen that the two ends of the magnet are brought inwardly and are ground to two opposing wedge-like tips 362 and 363. Both of these magnet-tips clear the highest points of the 30 lobes, generated about the circumference of the tone-wheel 357, by some .002 to .010 inch.

An induction coil, 359, consisting of thousands of turns of fine enameled copper wire is wrapped about the body of the permanent magnet, 358 and serves as a pick-up coil. The output of this pick-up coil is led to the output of the power-amplifier 218, Figure 16, through the two leads, 213 and 214.

Operation of the longitudinal-control frequency-regenerator is as follows: The output of the longitudinal-control pick-up coil 165, after being amplified by amplifier 168, is led to the synchronous motor 177 by the two conductors 180 and 181. The output of the reproducing-coil 166, which reproduces the base-frequency which has been recorded on the control-tape 162, is amplified by the amplifier 171 and is continuously impressed on the windings of the motor 178 through the two leads 182 and 183. As was stated before, the mechanical-type differential, 188, is identical in all respects to the mechanical-differential 188 illustrated in Figure 16. Therefore, the differential-shaft 194 (Figure 26) will rotate clockwise (when standing at the permanent magnet 358 and locking towards the differential 188) at the rate of exactly one revolution per second for each cycle that the frequency of the longitudinal-control current exceeds the frequency of the base-frequency current. Thus if the frequency of the longitudinal-control alternating-current is exactly 62 C. P. S., while the base-frequency is 60 C. P. S., the differential-base-frequency shaft 194 and the motor-stator 353 will rotate clockwise at an angular-velocity of 62—60 or 2 R. P. S.

As shown by Figure 27, the tone-wheel is continuously revolved in a clockwise direction and at an angular-velocity, as stated, of ten R. P. S. in relation to the stator 353. This tone-wheel has 30 high points, therefore 10×30 or 300 high points will pass by the two magnet tips 362 and 363 per second to inductably build up a feeble alternating-current whose frequency would be precisely 300 C. P. S. at such times as the differential shaft 194 is static.

Therefore, the tip 362 of the permanent magnet 358 is a north pole, when the magnet-tip 363 is a south pole of the magnet. The full magnetic-flux will be concentrated at these two tips and since the tone-wheel 357 is made of soft iron, it will be seen that the air-path through which the magnetic-flux must pass will be varied in length 300 times per second to inductively build up an alternating-current of similar frequency in the coil 359.

Due to a longitudinal-control alternating-current frequency of 62 C. P. S. causing the motor stator 353 to rotate in a clockwise direction at the rate of 2 R. P. S., the tone-wheel 357 under this condition would be rotated in a clockwise direction at the rate of 2+10 or 12 R. P. S. to produce an alternating-current output of the coil 359 whose frequency would be 12×30 or 360 C. P. S.

Similarly a longitudinal-control alternating-current frequency of 58 cycles would cause the stator 353 to rotate in a counter-clockwise direction at the rate of 2 R. P. S. which, in turn, would cause the tone-wheel 357 to be rotated in an angular-velocity of 10−2 or 8 R. P. S. The output of the pick-up coil 359 would therefore be an alternating-current whose frequency is 8×30 or 240 C. P. S.

The "high-cycle" frequency regenerator illustrated by Figure 26 may, in some instances, be preferable to the device having a like function illustrated in Figure 16. By mounting the small synchronous motor stator 353 integral to the differential-shaft 194, it is possible to use a permanent-magnet whose shape will make for higher electro-magnetic efficiency, since one pole piece acts as a return flux-path to the ferrous turn-wheel 357.

Figure 18 is a perspective view of a translator which is capable of converting the bounding area of three-dimensional bodies or cavities into three simultaneously generated control alternating-currents. The three separate alternating-currents generated by this translator are: a longitudinal-control alternating-current, a lateral-control alternating-current, an altitudinal-control alternating-current and an alternating-current of 60-cycle base-frequency. As in the translator illustrated by Figures 1 and 2, longitudinal movement of a stylus in a single plane will cause the frequency of the longitudinal-control current to vary in response to the longitudinal movement of the stylus while lateral movement of the stylus in a plane common to the longitudinal movement will cause the frequency of the lateral-control alternating-current to vary in response to the lateral movement of the stylus.

The frequency of the third or altitudinal-control alternating-current is varied in obeyance to the movement of the stylus in a direction which is normal to the plane in which the longitudinal and lateral displacements lie.

The three-dimensional translator illustrated by Figure 18 consists of a base, 501, and two upwardly-extending brackets, 502 and 503. A tubular-support, 504, is rigidly supported by the brackets, 502 and 503, in such a manner that the axis of the tubular-support is in exact parallelism with the upper plane-surface of the base, 501. A boom-support, 505, is slideably supported by the tubular-support 504. A tubular boom, 506, integral to the boom-support 505 extends outwardly over the top surface of the base in such a manner that the axis of this boom is in exact parallelism with the top plane-surface of the base 501 and is also exactly 90 degrees to the axis of the tubular-support. A cross-head, 507, is slideably supported by the outwardly-extending boom. It will be understood that the design and finish of the tubular-support, boom-support, boom and cross-head are such that movement of the stylus, 514, carried by the cross-head, can be effected in a substantially frictionless manner over any area of the top-surface of the translator base.

Figure 19 is a plan-view of the cross-head 507. This cross-head 507 may be considered identical to the cross-head 9, Figures 1, 2, 3 and 4, with the exception that besides having a lateral-control frequency-generator housing integral to it, it further has a second integral housing which encloses the altitudinal-control frequency-generator. A lateral-control gear-rack, 508, extends the full length of the boom, 506, in exactly the same manner as the gear-rack 8 (Figures 1, 3 and 4), extends along the length of the boom 6. For purposes of simplifying the drawing, the gear-rack 508 has not been shown in Figure 18. A second gear-rack which is identical structurally and functionally to the gear-rack 5 which extends along the length of the tubular-support 4 (Figures 1 and 2) is supportably mounted on the tubular-support 504 and extends parallel to the axis of this tubular-support from bracket 502 to bracket 503.

Figure 20 is an end-view of the cross-head 507 and clearly illustrates the positioning of the lateral-control frequency-generator housing 509 and the altitudinal-control frequency-generator housing 510 in relation to the cross-head 507. Figure 21 is a cross-section taken in a horizontal plane through the axis of the altitudinal-control frequency-generator housing. This view clearly illustrates that the altitudinal-control frequency-generator consists of elements which are electrically and mechanically identical to the frequency-generators utilized by the translator illustrated by Figures 1 and 2 to produce a longitudinal-control alternating-current frequency and a lateral-control alternating-current frequency. The specific altitudinal-control frequency-generator consists of a pinion-shaft, 511, made of Bakelite or similar non-conducting material, which integrally mounts a pinion, 512, whose teeth are in engagement with the teeth cut along the length of the stylus-rod 514. Two slip-rings, 515 and 516, made of bronze, are concentrically fitted on the pinion-shaft, 511.

Two electrical conductors (not shown) extend from the two slip-rings to which they are separately electrically bonded, through a concentrically bored section of the pinion-shaft to the windings of the synchronous motor-stator 513.

The rotor 519 of the synchronous motor terminates in a shaft or staff, 520, upon whose upper-end a 6 lobe tone-wheel 521 is pressed. This tone-wheel is made of soft iron and is some six to ten hundredths of an inch in thickness. An extension 522, integral to the housing 510, serves as an enclosure and rigid support for a pick-up magnet 523. A coil 524, consisting of thousands of turns of fine enameled copper wire, is pressed over the small diameter end of the pick-up magnet so that it is immediately adjacent to, but back of, the wedge-end of the magnet. The two end-leads of the pick-up coil 524 are brought out of the frequency-generator housing and are electrically connected to the two insulated conductors 525 and 526.

60-cycle alternating-current from a commercial source (which also supplies the similar frequency-generators used for generating the longitudinal and lateral-control frequencies) is continuously supplied to the two slip-rings 515 and 516 through the two leads 517 and 518, which are separately bonded to two carbon brushes which separately bear against the two slip-rings. The pinion-shaft 511 is rotatably supported by two ball-bearings whose outer-races are, as may be seen from a study of Figure 21, supported by the housing 510. The stylus-rod 514 has gear teeth 527 generated along substantially its entire length. The pitch of these teeth is identical to the pitch of the gear-racks 8 and 5, Figures 1, 3 and 4, or 40 teeth per inch. The pinion 512, which is in continuous engagement with the teeth cut in the stylus-rod, has 12 teeth which are obviously of the same pitch as the teeth cut in that member. The stylus-rod 514 is slideably supported by two bearing extensions, 530 and 531, which support the stylus-rod in such a manner that the stylus-rod may be displaced vertically with a minimum amount of friction.

The functioning of the altitudinal-control frequency-generator whose component parts have just been described, operates as follows: The stylus-rod, upon being displaced vertically in an upward direction at the rate of one inch per second (for example), will cause the stator 513 of the small frequency-generator drive-motor, to rotate in a clockwise direction (when standing at the stator-end of the pinion-shaft 511 and viewing the shaft towards the end ball-bearing or standing at the left of Figure 21 and looking towards its right) at the angular-rate of $$\frac{40}{12}$$

or 3.33 R. P. S. Inasmuch as the rotor 519 continuously rotates in a clockwise direction in relation to its coacting stator 213, it will be seen that 3.33 R. P. S. will be added to the 10 R. P. S. rotation of the rotor which will cause the 6-lobe tone-wheel 521 to rotate 3.33+10 or 13.33 R. P. S., which will cause the pick-up coil 524 to inductably generate an alternating-current whose frequency would be 13.33×6 or 80 C. P. S.

Conversely, downward movement of the stylus-rod at the rate of 1.000 inches per second, would cause the stator 513 to rotate at an angular-velocity which would also be 3.33 R. P. S. but in the opposite or counter-clockwise direction. This counter-clockwise rotation of the stator would cause the tone-wheel 521 to rotate at a velocity of 10−3.33 or 6.66 R. P. S., which would obviously cause the pick-up coil to generate an alternating-current whose frequency would be precisely 6.66×6 or 40 C. P. S.

From the description just given of the 3-dimensional translator illustrated by Figure 18, it will be seen that the functioning is identical to the 2-dimensional translator illustrated by Figures 1 and 2 except that the 3-dimensional translator, which has just been described, has means for varying the frequency of a third or altitudinal-control alternating-current above or below a datum or base-frequency in response to the vertical displacement of the stylus-rod 514.

Due to the fact that the altitudinal-control frequency-generator, enclosed in the housing 510, is mechanically and electrically identical to the lateral-control frequency-generator whose functioning was fully described in that section of this disclosure devoted to the description of the translator illustrated by Figures 1 and 2, it will be understood that the frequency of a third control alternating-current can be simultaneously varied in direct and instantaneous response to the rate and direction of the vertical displacement of the stylus-rod in precisely the same manner that the lateral-control alternating-current frequency was caused to be varied in obeyance to the lateral displacement of the stylus 15, Figures 2 and 4.

Figure 30 is a view taken in plan of a three-dimensional solid or form 650, whose surface contour is to be translated into a three-dimensional control-tape by progressively moving the stylus-rod 514 (Figure 18) over each infinitesimal area making up the body's surface. Figure 31 is a front elevation of the form 650. The form is securely fastened upon the translator-base 501 with the base of the form 650 in contact with the top horizontal plane-surface of the same 501. Stylus-rod guide-lines $a$, $b$, $c$ and $d$ are drawn on the sloping sides of the form which are parallel to the base and also to one another.

The contour-lines $a$, $b$, $c$ and $d$ serve as guide-lines over which the tip 523 of the stylus-rod 514 is progressively displaced. As the tip of the stylus-rod follows one of the contour-lines the axis of the stylus-rod will be displaced in a horizontal plane. The horizontal displacement of every point lying within one of the contour-lines is automatically measured in relation to the X—X and Y—Y axis.

The distance of every point on the contour lines in relation to the top-plane surface of the translator base (501, Figure 18) is also automatically measured by the distance that the tip 532 is displaced normal to the horizontal plane-surface of the translator-base 501.

The actual operation of the translator, illustrated in perspective by Figure 18, in converting the surface-area of the three-dimensional form (650, Figures 30 and 31) into a three-dimensional control-record would be as follows: The tip of the stylus-rod would be brought into register with the form 650 at the point marked "starting-point of stylus displacement." Controls (not shown) would be actuated which would simultaneously start the longitudinal-control frequency-generator, the lateral-control frequency-generator and altitudinal-control frequency-generator as well as the frequency-recorder system (similar to the recording system illustrated at the right of Figure 13 but with the addition, to the recording-head 197, of a fourth or altitudinal-frequency recording-coil with its attendant pre-amplifier and necessary circuits).

The tip, 532, of the stylus-rod 514 would now be moved from its static condition at the starting point along the contour-line $a$. Movement of the stylus-rod would be such that its rate of displacement would be gradually accelerated as it was displaced from its static condition at the starting-point, until it was being moved by the operator in a clockwise direction along the contour line $a$ at a linear rate of say approximately .10 inch per second.

Upon the tip of the stylus-rod being moved about the contour-line $a$ back to the "starting point," it would be slowly displaced to the adjacent parallel contour-line $b$ and the tip of the stylus-rod would be progressively moved in a clockwise direction along this second contour-line until the form 650 was completely traversed at the elevation delineated by the $b$ contour-line. The stylus-rod would then be displaced in the direction indicated by the arrow (Figure 30) to the third contour-line $c$ which would be progressed by the tip of the stylus-rod. This operation would continue until the remaining contour lines were traversed by the stylus-rod's tip.

As the stylus-rod is progressively displaced about any one of the contour-lines ($a$, $b$, $c$, and $d$) the frequency of the longitudinal-control current and the frequency of the lateral-control current will continuously vary above or below the base-frequency of 60 C. P. S. in exact proportion to the horizontal displacement of the stylus-rod. However, the frequency of the altitudinal-control alternating-current produced by the generator enclosed in the housing 510 integral to the cross-head 507 (Figures 18, 19, 20 and 21), will be 60-cycle base frequency except during those moments when the tip of the stylus-rod is being displaced from one contour-line to a contour-line immediately adjacent.

Although not shown in this disclosure, it will be distinctly understood that the frequency of this third or altitudinal-control alternating-current is recorded simultaneous to its generation on a separate "sound-track" along with the longitudinal-control, lateral-control, and base-frequency currents. It will therefore be understood that a fourth recording coil would have to be added to the recording-head 107, Figure 13, as well as a third amplifier which would amplify the output of the altitudinal frequency pick-up coil 524 before electro-magnetically impressing it on the steel control-tape 115, Figure 13.

In the reproduction of a three-dimensional control tape, it would be necessary to add a fourth reproducing coil to the three reproducing coils, 165, 166 and 167, carried by the reproducing-head. It would also be necessary to amplify the reproduced altitudinal-control frequency by means of the addition of a separate altitudinal-frequency amplifier identical to the longitudinal-control frequency or lateral-control frequency amplifiers 168 and 176 (Figure 16). It would also be essential to add a third "high-cycle" frequency-regenerator such as the one that has been described and which is illustrated by Figure 26. If this type of "high-cycle" frequency-regenerator should be used, it will be obvious that the two leads 213 and 214 of the pick-up coil 359 would serve to conduct the output of this pick-up coil to a third power-amplifier similar in all respects to either of the power-amplifiers 218 or 217.

Figure 22:
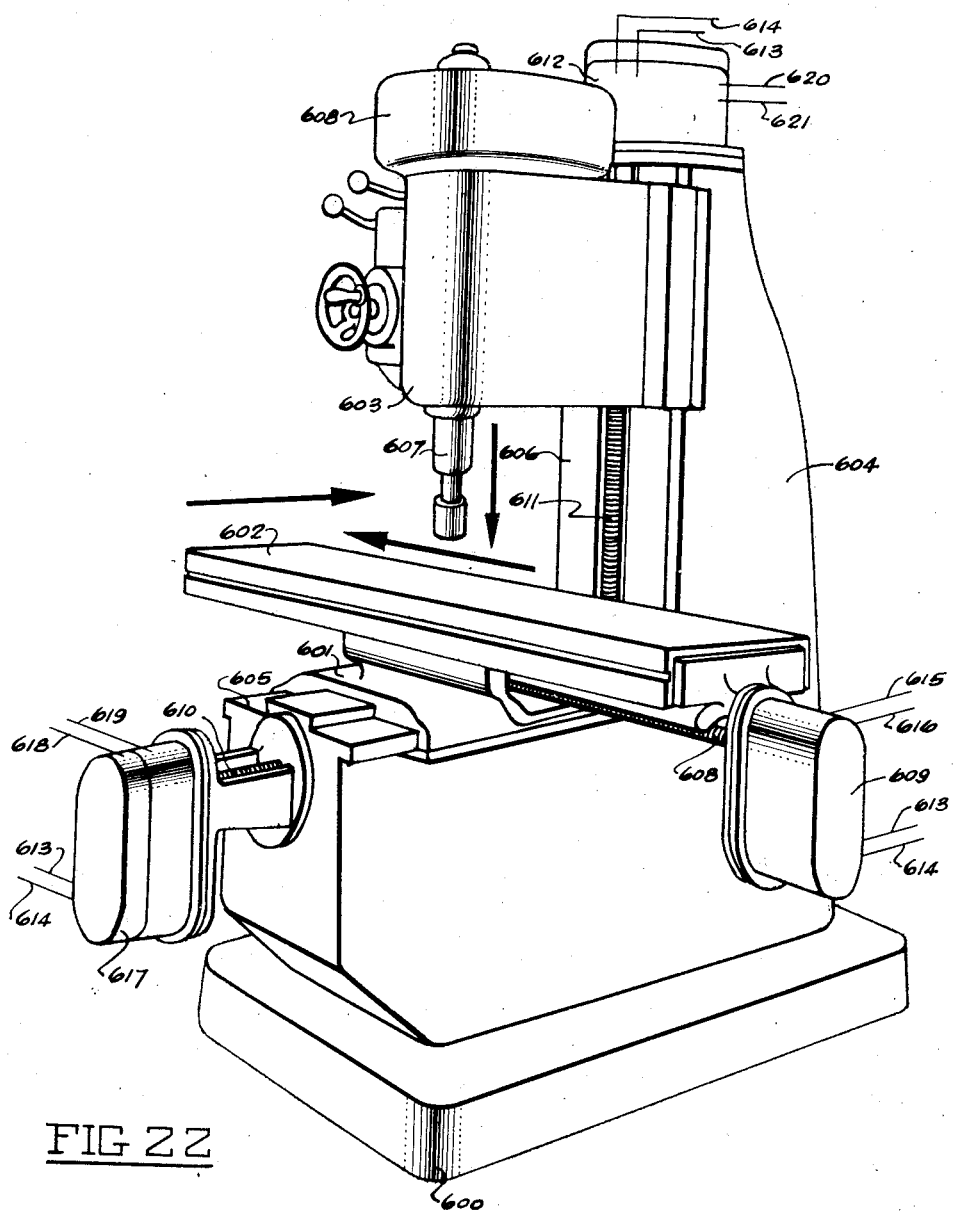
Figure 22 is a perspective view of a three-dimensional machine-tool whose work-to-tool movements are automatically controlled by the instant invention.

Figure 22 is a perspective view of a milling machine which is capable of machining stock in three dimensions. The miller or milling machine's major moving parts consist of a cross-slide, 601; a work-table, 602, and a spindle-head, 603. A spindle-head support, 604, is an integral part of the base, 600. The forward part, or knee, of the base is machined on its upper horizontal surfaces, 605, to serve as a slide for the cross-slide, 601. The upper surfaces of the cross-slide are machined in such a manner that they slideably support the work-table, 602. The forward vertical surfaces of the upwardly extending spindle-head-support are machined in such a manner as to act as guides, 606, for the vertical displacement of the spindle-head 603. The spindle, 607, is rotated by means of a motor drive, 608, of more or less orthodox type. Longitudinal displacement of the work-table 602 is accomplished by rotation of the longitudinal lead-screw 608. The magnitude and direction of rotation of this lead-screw is controlled at all times by the longitudinal-control servo-mechanism or power-unit 609. The lateral displacement of the work-table 602 is caused by a similar movement of the cross-slide 601. The displacement of this member is controlled by the rotation of the lateral lead-screw 610. A second, or lateral-control, power-unit 617, is mechanically coupled to this lateral lead-screw whose magnitude and direction of rotation is therefore precisely controlled by this lateral-control power-unit. Vertical movement of the spindle-head 603 is caused by rotation of the vertical lead-screw 611. This lead-screw is direct-connected to the altitudinal-control power-unit 612. These power-units are similar to the units 230 and 233, described hereinbefore.

60-cycle alternating-current from a commercial net-work or power-line is continuously fed to the 60-cycle field-windings of the longitudinal-control, lateral-control and altitudinal-control power-units through the common leads 613 and 614. "High-cycle" longitudinal-control alternating-current is supplied to the "high-cycle" field-winding of the longitudinal-control power-unit through two leads, 613 and 614. "High-cycle" lateral-control alternating-current is led to the "high-cycle" field-winding of the lateral-control power-unit 617 through the two leads 618 and 619. The altitudinal-control power-unit 612 receives "high-cycle" altitudinal-control alternating-current from an electronic type power-amplifier through the two conductors 613 and 614.

The longitudinal movement of the work-table 602, the lateral movement of the cross-slide 601 and therefore similar displacement of the work-table and the vertical displacement of the spindle-head 603 are controlled by the magnitude and direction of rotation of the lead-screws 608, 610 and 611 respectively. It will be understood that the pitch of these threads are identical, say 8 threads per inch for example. The three lead-screws are separately powered through reduction gearing of the same ratio by the three power-units 609, 617 and 612, respectively.

It will of course, from the prior description, be understood that the magnitudes, and directions of rotation of these three power-units will be varied in a predetermined manner by the frequency-differentials existing from instant to instant between the longitudinal-control frequency and the 60-cycle base-frequency, between the lateral-control frequency and the 60-cycle base-frequency and between the altitudinal-control frequency and the 60-cycle base-frequency as these four frequencies are electro-magnetically reproduced by a reproducing head having four separate staggered pickup-coils which would separately bear on four parallel tracks extending along the length of the control tape.

Methods and means have been fully described in this disclosure by whose use the linear displacement of a stylus, pointer, follower or like member parallel to a single axis can be instantaneously and automatically measured and translated into an alternating current which will vary above or below a fixed or base frequency in precise accordance with the rate, direction and magnitude of displacement of the stylus or follower.

Methods and means have also been described and illustrated by whose use any movement of a stylus in relation to an X—X and a Y—Y axis lying perpendicular to one another in a single plane can be simultaneously and continuously measured in relation to the X—X axis and the Y—Y axis. The displacement of the stylus parallel to the X—X axis is translated into a longitudinal-control alternating-current whose frequency-differential, in relation to a base frequency, is an exact index of the rate, magnitude and direction of displacement of the stylus parallel to this axis. The frequency of a second or lateral-control alternating-current is made to differentially vary in relation to the common base frequency in such a manner that the frequency-differential is an exact and instantaneous index of the rate, magnitude and direction of displacement of the stylus perpendicular to the X—X axis and parallel to the Y—Y axis.

By adding a third or altitudinal-control frequency-generator to the longitudinal and lateral-control frequency-generators just described it is possible to progressively measure each infinitesimal area making up the bounding-surface of a three-dimensional body or cavity from the plane in which the axes X—X and Y—Y lie. Such a three-dimensional translator has been described and is illustrated by Figure 18.

Although methods and means have been described and illustrated in this disclosure whereby straight-line displacements in one, two or three dimensions are translated into recorded frequencies which upon reproduction can be utilized to control similar movements of work-to-tool or tool-to-work members of machine tools, it will be understood that this invention is ideally suited for the measurement and reproduction of angles.

It will be of course understood although only the automatic control of a lathe and a milling-machine by the invention have been described and illustrated in this disclosure that the following as well as other machine tools can also be controlled by the reproduced control and base frequencies: grinders, shapers, planers, spar-mills, routers, automatic drill locators, punches, shears, bending rolls, etc., etc.

It is desirable to point out that the magnitude of the displacements of tool-to-work or work-to-tool members of machine-tools can be increased or decreased by any desired ratio in relation to the size of the template or three-dimensional form from which the control-record is made by merely changing the ratio of the reduction-gearing between the machine tool's lead-screws and the power-shaft of each servo-mechanism or power-unit which separately controls the rotation of each lead-screw.

If a quantity of irregular shaped cams, whose greatest dimension was 2 inches (as an example) were to be finished-milled on an automatic milling-machine, whose work-table was longitudinally and laterally displaced and whose spindle-head was vertically displaced by the action of reproduced frequencies which had been recorded on a control-tape, it would be perfectly possible to make up a three dimensional facsimile of the cam whose size could be increased twenty-five times so that the major dimension of the cam was 2 × 25 or 50 inches. If the facsimile of the cam was made with great care so that all of its dimensions were kept within .020 inch plus or minus it becomes apparent that the actual cam would be finished with an accuracy of $$\frac{.020}{25}$$

or .008 inch plus or minus.

Conversely the movement of machine-tools such as routers which operate over a very large area can be magnified from a small template if desired. In this event a gear step-up-unit would be used instead of a gear-reduction unit.

For the purpose of simplicity such essentials as switches, relays, flexible cables, cable-reels and other accessories well known in the arts have been purposely left out of the figures illustrating the invention.

Although I have described various apparatus which, when jointly used, are capable of carrying out the aims of the invention it will be distinctly realized that other equivalent devices may be used in obtaining the automatic control of the linear displacements of various members without departing from the scope of the invention.

Having fully described my invention, I claim:

1. A generator of alternating-current whose frequency is differentially varied in accordance with the rate of linear displacement of a slide-member comprising, a beam; a slide-member slidably supported by and capable of linear-displacement along said beam; a gear-rack carried by the beam and extending along said beam; a pinion-shaft rotatably supported by said slide-member; a pinion integral and concentric to said pinion-shaft and in mesh with said gear-rack; a syn-shaft and in mesh with said gear-rack; a synchronous-motor stator connected with said pinion-shaft whose axis is in coincidence with the axis of said pinion-shaft; means for supplying said stator with alternating-current; a rotor, said rotor electrically coacting with and being driven at a synchronous speed by said stator; a ferrous tone-wheel driven by said rotor; a stationary permanent-magnet in electro-magnetic coaction with said tone-wheel and a pick-up coil wound about said magnet for inductively generating an alternating-current by electro-magnetic interaction between said tone-wheel and said pick-up coil.

2. In a system for reproducing movement in a tool, or the like, means for simultaneously reproducing two pulsating currents from a record of two pulsating currents, the frequency of one current being variable relative to the other; two relatively driven motors, one of said motors being adapted to be driven at a speed that varies in direct proportion to the frequency of one of said reproduced currents and the other of said motors being adapted to be driven at a speed that varies in direct proportion to the frequency of the other of said reproduced currents; a speed differential mechanism driven by said two motors; and means responsive to the output of said differential mechanism for effecting movement of a tool.

3. In a system for reproducing movement in a tool, or the like, means for simultaneously reproducing two pulsating currents from a record of two pulsating currents, the frequency of one current being variable relative to the other; two relatively driven motors, one of said motors being adapted to be driven at a speed that varies in direct proportion to the frequency of one of said reproduced currents and the other of said motors being adapted to be driven at a speed that varies in direct proportion to the other of said reproduced currents; a speed differential mechanism driven by said two motors; generating means for generating a current having a variable frequency, the last mentioned means being driven by the output shaft of said differential mechanism; and an electrical tool driving motor controlled by the frequency generated by the last mentioned frequency generator.

4. The method of controlling the movement of a tool, or the like, which comprises, recording the frequency of a pulsating current; simultaneously generating a pulsating current having a frequency which corresponds to the frequency of the first mentioned current; moving a stylus relative to a coordinate system and varying the frequency of the generated current according to the rate of movement of the stylus along an ordinate of the coordinate system; recording the frequency of the generated current in step with the recording of the frequency of the first mentioned current; subsequently playing back said recordings in step and generating currents having frequencies corresponding, respectively, to the frequencies indicated by the play back of said recordings; and utilizing the differential between the frequencies of the last mentioned currents from instant to instant for determining the rate of movement of the tool from instant to instant relative to an ordinate of a coordinate system.

5. The method of controlling the movement of a tool, or the like, which comprises, recording the frequency of a pulsating current; simultaneously generating a pulsating current having a frequency which corresponds to the frequency of the first mentioned current; moving a stylus relative to a coordinate system and increasing the frequency of the generated current when the stylus is moved in one direction along an ordinate of the coordinate system and decreasing the latter frequency when the stylus is moved in the opposite direction, said increase and decrease being proportional to the rate of movement of the stylus along to said ordinate; recording the frequency of the generated current in step with the recording of the frequency of the first mentioned current; subsequently playing back said recordings in step and generating currents having frequencies corresponding, respectively, to the frequencies indicated by the play back of said recordings; and utilizing the differential between the frequencies of the last mentioned currents from instant to instant for determining the rate and direction of movement of the tool from instant to instant relative to an ordinate of a coordinate system.

6. The method of controlling the movement of a tool, or the like, which comprises, recording the frequency of a pulsating current; simultaneously generating two pulsating currents each having a frequency which corresponds to the frequency of the first mentioned current; moving a stylus relative to a coordinate system and varying the frequency of one of said generated currents proportional to the rate of movement of the stylus relative to one ordinate of said coordinate system and varying the frequency of the other of said generated currents proportional to the rate of movement of the stylus relative to another ordinate of the coordinate system; recording the frequencies of the generated currents in step with the first mentioned recording; subsequently playing back said recordings in step and generating pulsating currents having frequencies corresponding, respectively, to the frequencies indicated by the play back of said recordings; and utilizing the differentials existing, from instant to instant, between the frequency of the one of the last mentioned generated currents which corresponds to the first mentioned recorded frequency and the frequencies of the other two last mentioned generated currents, respectively, for determining the rate of movement of said tool, from instant to instant, relative to the respective ordinates of a coordinate system.

LEIF ERIC DE NEERGAARD.

REFERENCES CITED

The following references are of record in the file of this patent:

UNITED STATES PATENTS

| Number | Name | Date |
|---|---|---|
| 1,998,939 | Mittag | Apr. 23, 1935 |
| 2,283,240 | Trinkle | May 19, 1942 |
| 2,029,335 | Oberhoffken et al. | Feb. 4, 1936 |
| 2,278,654 | Homer et al | Apr. 7, 1942 |
| 1,542,038 | Day | June 16, 1925 |
| 2,322,653 | Mitchell | June 22, 1943 |
| 2,168,047 | Skellett | Aug. 1, 1939 |
| 2,213,108 | Pollard | Aug. 27, 1940 |
| 2,092,142 | Schiitz | Sept. 7, 1937 |
| 2,087,782 | Rossman | July 20, 1937 |
| 2,286,571 | Pollard | June 16, 1942 |

FOREIGN PATENTS

| Number | Country | Date |
|---|---|---|
| 111,789 | Austria | Nov. 7, 1940 |